United States Patent
Kodama et al.

(10) Patent No.: US 9,826,579 B2
(45) Date of Patent: Nov. 21, 2017

(54) ILLUMINATION SYSTEM

(75) Inventors: Naofumi Kodama, Shiga (JP); Kazufumi Oogi, Osaka (JP); Tosiharu Suenaga, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 369 days.

(21) Appl. No.: 14/123,769

(22) PCT Filed: Jun. 1, 2012

(86) PCT No.: PCT/JP2012/003634
§ 371 (c)(1),
(2), (4) Date: Dec. 4, 2013

(87) PCT Pub. No.: WO2012/169165
PCT Pub. Date: Dec. 13, 2012

(65) Prior Publication Data
US 2014/0111094 A1    Apr. 24, 2014

(30) Foreign Application Priority Data
Jun. 7, 2011   (JP) .................. 2011-127095

(51) Int. Cl.
*F21V 9/16*    (2006.01)
*H05B 33/08*   (2006.01)
(Continued)

(52) U.S. Cl.
CPC ............. *H05B 33/08* (2013.01); *F21V 21/35* (2013.01); *F21V 23/06* (2013.01);
(Continued)

(58) Field of Classification Search
CPC .................................................. H05B 33/08
(Continued)

(56) References Cited

U.S. PATENT DOCUMENTS 4,039,820 A * 8/1977 Materese ................ F21V 17/14
                                                      362/223
5,671,997 A * 9/1997 Potts ................... G09F 13/0413
                                                      362/159
(Continued)

FOREIGN PATENT DOCUMENTS

JP   10-189239     7/1998
JP   2007-034240   2/2007
(Continued)

OTHER PUBLICATIONS

Search report from International Search Report in PCT/JP2012/003634 with English language translation, dated Sep. 4, 2012.
(Continued)

*Primary Examiner* — Bryon T Gyllstrom
(74) *Attorney, Agent, or Firm* — Greenblum & Bernstein, P.L.C.

(57) ABSTRACT

A lighting system includes an EL unit having a light emitter, a holding frame that holds the EL unit, and a control unit that controls lighting of the EL unit, wherein the holding frame includes a rail-shaped conductive member, and power and communication signals are transmitted between the control unit and the EL unit through the conductive member. With this configuration, since the connection between the control unit and the EL unit is made by the conductive member provided on the holding frame, which holds the EL unit, space for wiring in a residential space can be reduced. Further, simply by placing the holding frame on a mounting surface and attaching the EL unit and the control unit to the holding frame, they are connected. Therefore, without special skills, a resident can install the lighting system as appropriate and can easily replace the EL unit.

20 Claims, 18 Drawing Sheets

(51) Int. Cl.
 *F21V 23/06* (2006.01)
 *F21V 21/35* (2006.01)
 *F21Y 105/00* (2016.01)
 *F21Y 115/15* (2016.01)

(52) U.S. Cl.
 CPC ....... *F21Y 2105/00* (2013.01); *F21Y 2115/15* (2016.08); *H01L 2251/5361* (2013.01)

(58) Field of Classification Search
 USPC .......................................................... 362/84
 See application file for complete search history.

(56) References Cited

U.S. PATENT DOCUMENTS

| | | | | |
|---|---|---|---|---|
| 5,724,909 | A * | 3/1998 | Pitman | F21K 2/00 116/202 |
| 5,775,016 | A * | 7/1998 | Chien | G09F 13/22 362/570 |
| 5,941,627 | A * | 8/1999 | Sacher | F21V 19/0005 362/145 |
| 6,170,958 | B1 * | 1/2001 | Chien | F21S 8/035 362/84 |
| 7,244,036 | B2 * | 7/2007 | Murakami | B60Q 11/005 315/77 |
| 8,328,375 | B2 * | 12/2012 | Diekmann | F21S 6/002 313/504 |
| 2002/0075671 | A1 * | 6/2002 | Tufte | B60Q 1/32 362/86 |
| 2002/0159741 | A1 * | 10/2002 | Graves | B60Q 1/26 385/133 |
| 2003/0179578 | A1 * | 9/2003 | Albert | F21V 21/15 362/276 |
| 2003/0184991 | A1 * | 10/2003 | Johnston | G02B 6/0095 362/601 |
| 2006/0002102 | A1 * | 1/2006 | Leonard | A01M 1/2055 362/96 |
| 2007/0285949 | A1 * | 12/2007 | Lodhie | F21S 8/038 362/648 |
| 2009/0086478 | A1 * | 4/2009 | Sanroma | A47F 3/001 362/234 |
| 2010/0271812 | A1 * | 10/2010 | Harnischmacher | F21V 15/01 362/183 |
| 2012/0033431 | A1 * | 2/2012 | Martinez | F21V 15/013 362/294 |

FOREIGN PATENT DOCUMENTS

| | | |
|---|---|---|
| JP | 2007-157361 | 6/2007 |
| JP | 2008-193840 | 8/2008 |
| JP | 2009-152009 | 7/2009 |
| JP | 2010-009886 | 1/2010 |
| JP | 2010-225983 | 10/2010 |

OTHER PUBLICATIONS

International Preliminary Report on Patentability in PCT/JP/2012/003634, dated Dec. 10, 2013, with Written Opinion of the International Searching Authority with English language translation.

* cited by examiner

ILLUMINATION SYSTEM

TECHNICAL FIELD

The present invention relates to a lighting system in which an EL device is used as a light source.

BACKGROUND ART

In an electroluminescence (EL) device, a light emitter having a light emitting layer arranged between a positive electrode and a negative electrode is formed on a transparent substrate. When a voltage is applied to between the above electrodes, the EL device emits light by excitons generated by recombination of electrons, which are injected into the light emitting layer as carriers, and holes.

EL devices can be broadly classified into organic EL devices having a light emitting layer of an organic compound and inorganic EL devices having a light emitting layer of an inorganic compound. Especially, an organic EL device can emit light of high intensity at a low voltage, can provide various emission colors depending on the type of organic compound, and can be easily manufactured as a flat light emitting panel. Therefore, the use of it as a light source in a lighting apparatus has recently attracted attention.

There is known a light emitting apparatus using this kind of EL device wherein a light emitting panel using an EL device and a circuit board that controls the lighting of the light emitting panel are mounted in a case for modularization (see, for example, Patent Document 1).

PRIOR ART DOCUMENT

Patent Document

Patent Document 1: Japanese Laid-open Patent Publication No. Hei 10-189239

SUMMARY OF THE INVENTION

Problems to be Solved by the Invention

However, the light emitting apparatus disclosed in the above Patent Document 1 requires wiring for power supply when it is installed on a wall surface or other mounting surface, which may affect the appearance of the light emitting apparatus. On the other hand, if the wiring is covered with a building material or the like so as not to impair the appearance of the light emitting apparatus, a residential space may be limited. Further, in a lighting system using multiple EL units, a power supply, which supplies power to the EL units, and a controller, which transmits and receives control information and other communication signals from the EL units, are individually provided and connected to the respective EL units in different paths. In such a case, space for wiring both a power supply line and an information line is needed inside the wall or ceiling, and for securing the space, the residential space may be limited. Further, since the wiring is complicated, special skills and man-hours are needed for the installation and it is not easy for an end user to install and maintain the system, which makes it difficult for this kind of lighting system to be installed in an average house.

The present invention has been made in view of the above described problems. An object of the present invention is to provide a lighting system that allows wiring space in a residential space to be reduced and that can be easily installed and allows the light source to be easily replaced.

Means for Solving the Problems

In order to solve the above described problems, the present invention includes: an EL unit having a light emitter; a holding frame that holds the EL unit; and a control unit that controls lighting of the EL unit, wherein the holding frame includes a rail-shaped conductive member, and power and communication signals are transmitted between the control unit and the EL unit through the conductive member.

Preferably, in the above lighting system, the EL unit has a controller that controls light-emitting state of the light emitter in response to the communication signals from the control unit.

Preferably, in the above lighting system, the control unit has a power supply that transmits power to the conductive member.

Preferably, the above lighting system includes a pair of protection units that is disposed at both ends of the holding frame and protects the conductive member, wherein the control unit is mounted in one of the protection units.

Preferably, the above lighting system includes a case unit that is held by the holding frame, wherein the control unit is mounted in the case unit.

Preferably, in the above lighting system, the holding frame includes a cover member that is disposed over the conductive member and is movable, and the conductive member is exposed with respect to the EL unit by moving the cover member.

Preferably, in the above lighting system, the holding frame has an elongated shape and includes a pair of linear recesses extending to both the ends of the holding frame in its longitudinal direction, and the EL unit includes a pair of projections, which is to be engaged with the linear recesses, on a surface of the EL unit facing the holding frame and is held on the holding frame by engagement of the projections with the linear recesses.

Preferably, in the above lighting system, the holding frame has an elongated shape and includes a hook formed on one of edge portions extending along its longitudinal direction and a recess formed in the other of edge portions; the hook is slidable while being biased in a direction perpendicular to the longitudinal direction; and the EL unit includes, on a surface thereof facing the holding frame, a hooked portion that is to be engaged with the hook and a projection that is to be engaged with the recess, and the EL unit is held on the holding frame by engagement of the projection with the recess and by engagement of the hooked portion with the hook.

Preferably, in the above lighting system, the holding frame has an elongated shape and includes a pair of recesses formed in two edge portions extending along its longitudinal direction; and the EL unit includes a pair of projections, which is to be engaged with the recesses, on a surface thereof facing the holding frame, and one of the pair of projections is slidable while being biased in a direction perpendicular to the longitudinal direction of the holding frame, and the EL unit is held on the holding frame by engagement of the one of the pair of projections with the recess and by engagement of the other of the pair of projections with the recess.

Preferably, in the above lighting system, the EL unit includes a fixed portion protruding toward the holding frame on a surface of the EL unit facing the holding frame; the fixed portion has a pair of claws that is slidable while being biased in directions perpendicular to the protruding direction; the holding frame has a receiving portion, which is to be engaged with the claws, at a position corresponding to the fixed portion; and the EL unit is held on the holding frame by engagement of the pair of claws with the receiving portion.

Preferably, in the above lighting system, the EL unit includes a fixed portion protruding toward the holding frame on a surface of the EL unit facing the holding frame; the fixed portion has a pair of claws that is slidable while being biased in directions perpendicular to the protruding direction; the holding frame has an elongated shape and includes a linear receiving portion that extends to both the ends of the holding frame in its longitudinal direction and is configured to be engaged with the claws; and the EL unit is held on the holding frame by engagement of the pair of claws with the linear receiving portion.

Preferably, in the above lighting system, the EL unit and the holding frame are connected by a wire.

Preferably, in the above lighting system, the control unit and the EL unit authenticate each other, and when the EL unit is authenticated, the control unit supplies power to the EL unit.

Preferably, in the above lighting system, the control unit outputs a warning signal when the EL unit is removed from the holding frame.

Preferably, in the above lighting system, the control unit does not output the warning signal when administrative information is entered by an administrator.

Effect of the Invention

According to the present invention, since the connection between the control unit and the EL unit is made by the conductive member provided on the holding frame which holds the EL unit, space for wiring in a residential space can be reduced. Further, simply by attaching the EL unit and the control unit to the holding frame mounted on a mounting surface, they are connected. Therefore, without special skills, a resident can install the lighting system as appropriate and can easily replace the EL unit.

MODES FOR CARRYING OUT THE INVENTION

Figure 1:
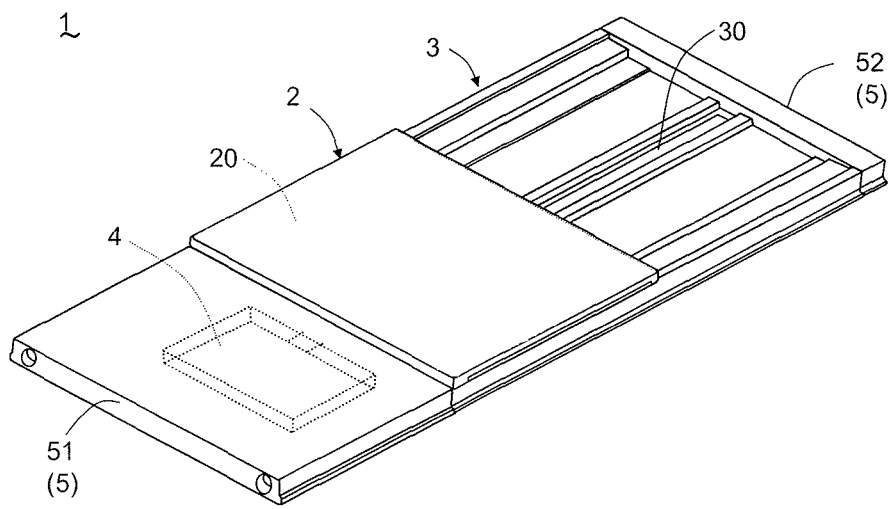
FIG. 1 is a perspective view of a lighting system according to a first embodiment of the present invention.

Referring to FIGS. 1 to 13, a lighting system according to a first embodiment of the present invention is described. As shown in FIG. 1, the lighting system 1 of this embodiment includes an EL unit 2 having a light emitter 20 using an organic EL device, a holding frame 3 that holds the EL unit 2, and a control unit 4 that controls the lighting of the EL unit 2. The holding frame 3 includes a rail-shaped conductive member 30. The conductive member 30 transmits power and communication signals between the control unit 4 and the EL unit 2. Further, at both ends of the holding frame 3, a pair of protection units 5 is provided in order to protect the ends of the conductive member 30. The protection units 5 include a front cap 51 that is attached to one end of the holding frame 3 and an rear cap 52 that is attached to the other end. In the example shown in the figure, the single EL unit 2 is provided for the single holding frame 3, but the lighting system 1 of this embodiment allows multiple EL units 2, to each of which an address is assigned, to be provided for a single holding frame 3. Further, the control unit 4 can control the lighting of the multiple EL units 2 separately. The holding frame 3 shown in the same figure is twice as long as the EL unit 2, but practically a longer one may be used and multiple holding frames 3 may be connected and used.

Figure 2:
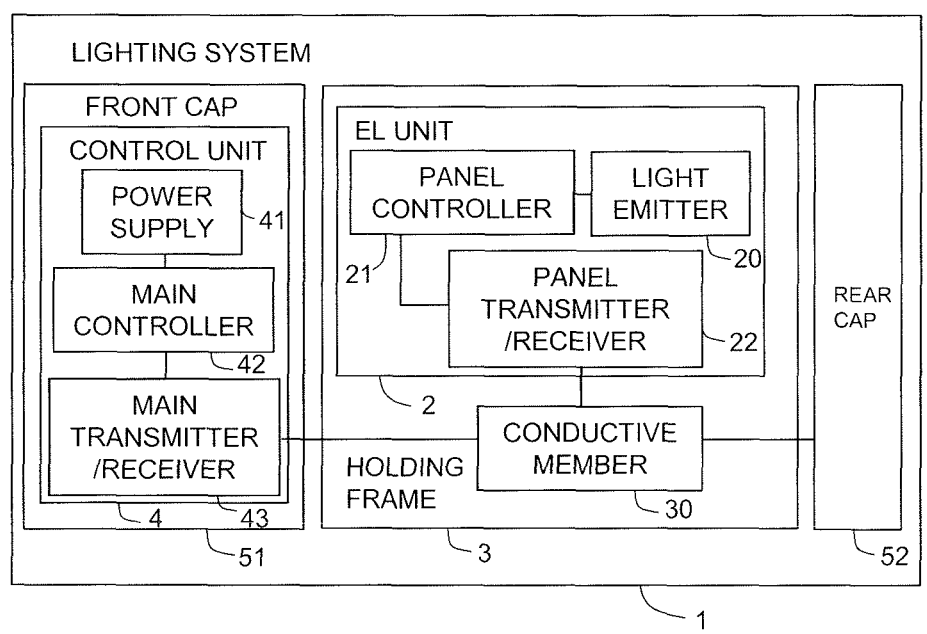
FIG. 2 is a block diagram of the lighting system.

As shown in FIG. 2, the control unit 4 includes a power supply 41 that converts commercial power to a predetermined direct current, a main controller 42 that controls electric power to be transmitted to the light emitter 20 and communication information, and a main transmitter-receiver 43 that is controlled by the main controller 42 and transmits the electric power and the communication information to the conductive member 30. In this embodiment, the control unit 4 is mounted in the front cap 51 (one of the protection units 5). When the front cap 51 is attached to the one end of the holding frame 3, the main transmitter-receiver 43 comes in contact with the conductive member 30 so that they are electrically connected. The power supply 41 is composed of an AC/DC converter including a switching power supply; a transformer; and so on, and produces a current to be transmitted to the conductive member 30. The power supply 41 may further include a secondary battery, which converts an alternating current supplied from the commercial power supply into a direct current and stores it. Alternately, without connection to the commercial power supply, a general-purpose battery, which is replaced as needed, may be used. Since the power supply 41 is mounted in the control unit 4, the system configuration is simple, thereby enabling an end user to install the lighting system 1 easily. The main controller 42 includes a control and storage devices such as a general-purpose CPU and a memory. This main controller 42 recognizes the EL unit 2 held on the holding frame 3 and controls the main transmitter-receiver 43 so that a predetermined power is supplied to the EL unit 2. At this time, so-called power line communication, in which communication signals for data transmission with a high frequency carrier are superimposed on DC voltage, is performed. Based on the power line communication, communication information including a power use state, such as power consumption and operating time of the EL unit 2, is transmitted to control the EL unit 2. The main transmitter-receiver 43 has a voltage control circuit, an inverter circuit, and so on, and under the control of the main controller 42, transmits the direct current, on which the communication information is superimposed, to the conductive member 30. Further, the control unit 4 includes an interface (not shown) in which an administrator inputs administrative information such as address information and dimming information for the EL unit 2 used in the system.

The holding frame 3 has the rail-shaped conductive member 30 extending to both the ends to which the front cap 51 and the rear cap 52 are attached. For the conductive member 30, a conductive metal sheet such as copper foil sheet is used. One surface of the conductive member 30 is exposed partially or entirely toward the EL unit 2, and the exposed portion serves as a feeding point for the EL unit 2. Although the conductive member 30 is shown as a piece of sheet-like member in the example of the figure, a positive electrode wire and a negative electrode wire are provided side by side to be isolated from each other.

In addition to the light emitter 20, the EL unit 2 includes a panel controller 21 that controls the light-emitting state of the light emitter 20 and a panel transmitter-receiver 22 that is electrically connected to the conductive member 30. The light emitter 20 includes a light-emitting portion (not shown) in which a positive electrode made of transparent conductive film, a light emitting layer having a light emitting function, and a light-reflective negative electrode are formed, in this order, on a rectangular light transmissive substrate, and the outer side of the light emitting portion is covered with a seal. In this embodiment, an organic EL device using an organic light emitting material for the light emitting layer is preferably used. In the light emitter 20, electrode extraction terminals 20a (see FIG. 5 described later) are provide on a surface opposite to the light emitting surface through an auxiliary electrode or the like, corresponding to each of the above positive and negative electrodes. The panel controller 21 is configured by mounting various components, such as a general-purpose microprocessor, a memory, and a transformer circuit, on a circuit board, and directly controls the light-emitting state of the light emitter 20 in response to the power from the conductive member 30 and the communication signals from the control unit 4. Further, it transmits information such as the address and configuration of the EL unit 2 (light emitter 20) to the main controller 42 in the control unit 4. The panel transmitter-receiver 22 includes a connection terminal that comes in contact with the conductive member 30, and electrically connects the conductive member 30 and the panel controller 21.

Figure 3:
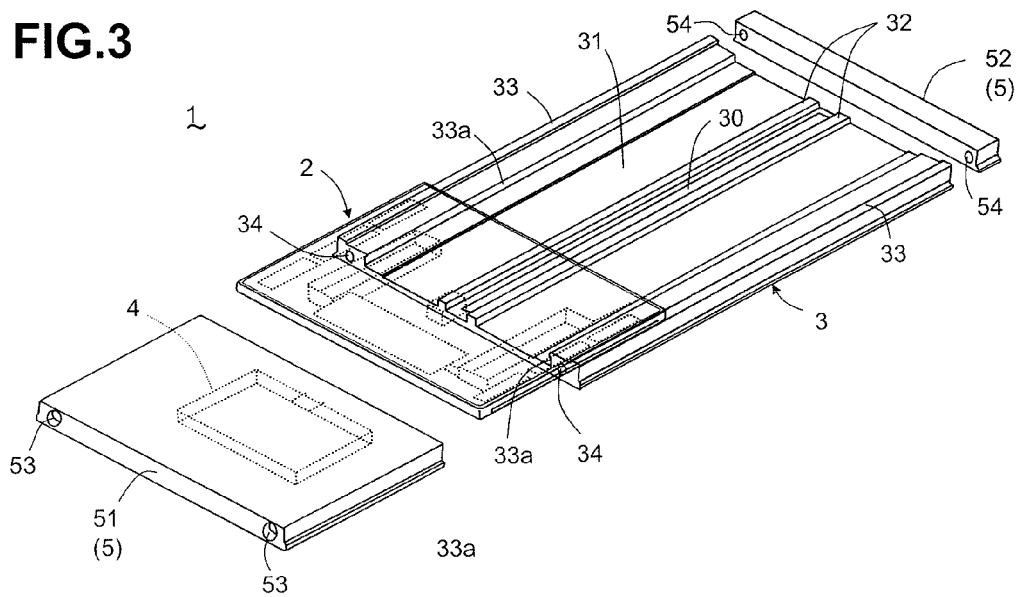
FIG. 3 is an exploded perspective view of the lighting system.

Next, the structural features of the holding frame 3, the protection units 5 (the front cap 51 and the rear cap 52), the EL unit 2, and so on that make up the lighting system 1 are described. As shown in FIG. 3, the holding frame 3 is an elongated member and has a pair of linear projections 32 formed along the longitudinal direction at the center of one side of a fixed surface 31, which is to be fixed to a mounting surface such as an indoor wall or a building material. The conductive member 30 is disposed on the bottom of a linear recess sandwiched by the pair of linear projections 32. As described above, a copper foil sheet is used for the conductive member 30, and preferably, the surface thereof is plated with silver or the like for prevention of adhesion. The other side of the fixed surface 31, which is not provided with the conductive member 30, is formed as a smooth surface. The edges of the fixed surface 31 protrude in the lateral direction of the holding frame 3 to form a flange-like shape (see FIG. 7 described later). This can make it easy to distinguish between the front and back surfaces of the holding frame 3 at the time of installation and can increase the area of contact between the fixed surface 31 and a mounting surface, thus improving mounting stability.

Two edge portions 33 of the holding frame 3 stand vertically from the fixed surface 31, and are formed to have a thickness thicker than that of the linear projections 32 and a predetermined width. The two edge portions 33 are stepped to have higher outside edges, and the outside edges come in contact with the edges of the back surface of the EL unit 2. On the other hand, at each of the inside edges of the two edge portions 33, a linear recess 33a is formed to extend to both the ends in the longitudinal direction of the holding frame 3. The pair of linear recesses 33a is arranged in the two edge portions 33 of the holding frame 3 so as to be symmetrical with respect to the conductive member 30. In the respective end faces of the two edge portions 33, screw holes 34 are formed for insertion of screws that secure the front cap 51 and the rear cap 52. In the fixed surface 31 of the holding frame 3 except for the conductive member 30, the linear projections 32, and the two edge portions 33, holes (not shown) for insertion of screws or the like for securing the holding frame 3 to a mounting surface are formed at predetermined intervals. The holding frame 3 is made of, for example, a plastic material such as ABS resin, acrylic resin, or polystyrene resin, or a metallic material such as insulated aluminum.

The end faces of the front cap 51 and the rear cap 52 that come in contact with the holding frame 3 are formed to have shapes corresponding to the respective ends of the holding frame 3. Their thickness (height from a mounting surface) is substantially the same as that of the thickest parts of the two edge portions 33 of the holding frame 3. Further, in the end faces of the front cap 51 and the rear cap 52, through holes 53 and 54 are formed so as to communicate with the screw holes 34 in the holding frame 3. By tightening screws (not shown) inserted through the through holes 53, 54 into the screw holes 34, the front cap 51 and the rear cap 52 are connected to the two ends of the holding frame 3, respectively. The method of connecting them is not limited to the screw fixation described above, as long as it is possible to attach and remove the front cap 51 and the rear cap 52 from the holding frame 3 as appropriate. For example, they may be connected by springs or the like. The edges of the front cap 51 and the rear cap 52 facing a mounting surface protrude to form a flange-like shape and to be continuous with the two edge portions of the holding frame 3. This can make it easy to distinguish between the two sides of the front cap 51 and the rear cap 52 at the time of connection to the holding frame 3.

Figure 4:
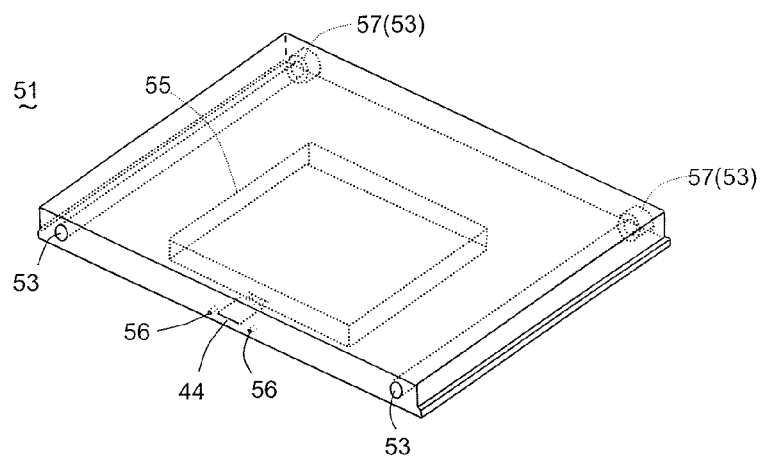
FIG. 4 is a perspective view of a protection unit (front cap) used in the lighting system.

The front cap 51 of this embodiment is a case-shaped member having a predetermined width in the direction in which the holding frame 3 is connected and, as shown in FIG. 4, it has a holder 55 in which the control unit 4 is mounted. The front cap 51 is provided with a contact 44 for input and output of signals, extending from the inside of the holder 55 toward one end that is to be connected to the holding frame 3. The contact 44 is in contact with the main transmitter-receiver 43 (see FIG. 2) of the control unit 4 mounted in the holder 55. Further, the contact 44 is formed so as to protrude slightly from the end of the front cap 51 and comes in contact with the conductive member 30 of the holding frame 3 when the front cap 51 is connected to the holding frame 3. Thereby, the main transmitter-receiver 43 of the control unit 4 (see FIG. 2) is electrically connected through the contact 44 to the conductive member 30 of the holding frame 3. Like the conductive member 30, this contact 44 is plated with silver or the like for prevention of adhesion. At the one end of the front cap 51 that is connected to the holding frame 3, two locating holes 56 are formed to interpose the contact 44 therebetween. At the end of the holding frame 3, locating pins (not shown) are provided so as to extend from the linear projections 32. With engagement of the locating pins and the locating holes 56, the holding frame 3 and the front cap 51 are positioned to each other. The through hole 53 is provided with a countersink 57, which has a larger diameter, formed at the other end opposite to the one end that is connected to the holding frame 3, and the head of a screw is held in the countersink 57. This can prevent exposure of the screw head, thus improving the appearance.

Figure 5:
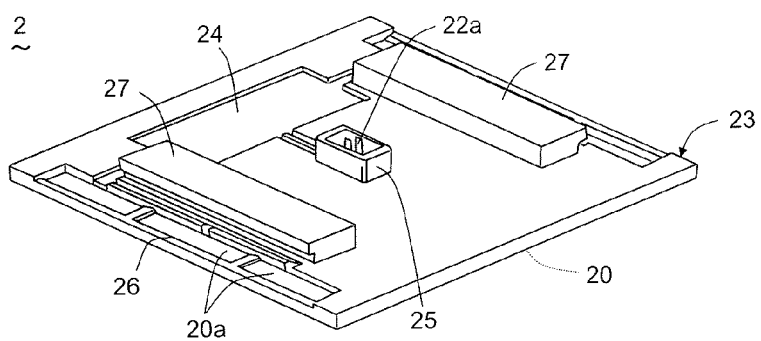
FIG. 5 is a perspective view of an EL unit used in the lighting system.

As shown in FIG. 5, the EL unit 2 has a case 23 that holds the light emitter 20. The front surface of the case 23 is light transmissive and is formed as a surface to guide light from the light emitter 20. The back surface of the case 23 (surface facing the holding frame 3) has a recess 24 that holds the panel controller 21 (see FIG. 2), a guide block 25 in which a feeding terminal 22a provided on the panel transmitter-receiver 22 is enclosed, and an opening 26 through which the electrode extraction terminal 20a of the light emitter 20 is exposed. Further, in this embodiment, a pair of projections 27 that is to be engaged with the linear recesses 33a of the holding frame 3 is formed on the back surface of the case 23. Wiring gutters are provided between the guide block 25 and the recess 24, and between the recess 24 and the opening 26, respectively. The guide block 25 is formed to have a size to be received between the pair of linear projections 32 of the holding frame 3. The feeding terminal 22a is arranged so that its tip protrudes slightly from the guide block 25, and is biased in the direction of protrusion. Like the contact 44 and the conductive member 30, the feeding terminal 22a is also plated with silver or the like for prevention of adhesion. The case 23 is made of, for example, a plastic material or a metallic material like the holding frame 3.

Figure 6:
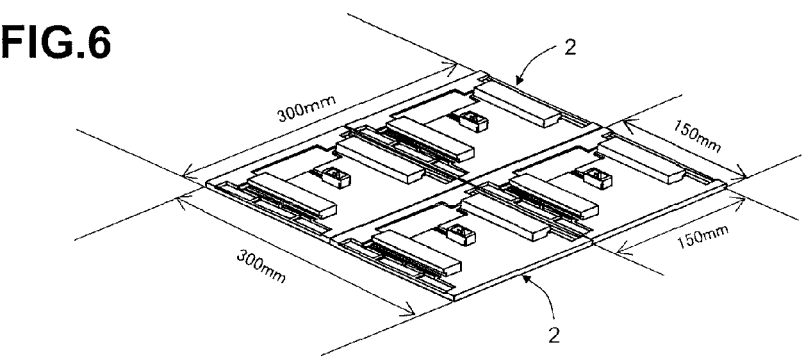
FIG. 6 is a perspective view for illustrating the size of the EL unit.

As shown in FIG. 6, the EL unit 2 is, for example, a square of 150 mm×150 mm. Thus, when four EL units 2 are arranged in a matrix of 2 rows and 2 columns, the size is a square of 300 mm×300 mm, which is the standard panel size of building materials. In other words, this size allows the lighting system 1 to blend in with building materials and can create a visual effect so that a resident feels there is no lighting apparatus and the wall or ceiling is shining.

Figure 7:
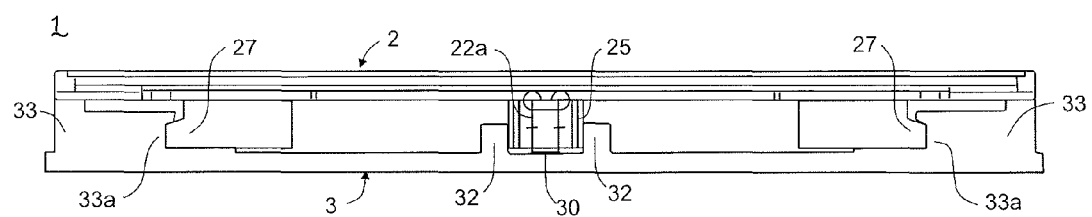
FIG. 7 is an end view of the lighting system.

In this embodiment, as shown in FIG. 3 and FIG. 7 described above, the EL unit 2 is held on the holding frame 3 by sliding and inserting the EL unit 2 from the end of the holding frame 3, so that the projections 27 of the EL unit 2 are engaged with the linear recesses 33a of the holding frame 3. At this time, the feeding terminal 22a of the EL unit 2 comes in contact with the conductive member 30 of the holding frame 3, so that they are electrically connected. Since the projections 27 and the guide block 25 of the EL unit 2 are guided by the linear recesses 33a and the linear projections 32 of the holding frame 3, respectively, the EL unit 2 is held slidably along the longitudinal direction of the holding frame 3. Then, by attaching the front cap 51 to one end of the holding frame 3 with the EL unit 2 held in the predetermined position on the holding frame 3, the control unit 4 in the front cap 51 and the EL unit 2 are electrically connected through the conductive member 30. Further, by attaching the rear cap 52 to the other end of the holding frame 3, the ends of the conductive member 30 can be protected. In this manner, the lighting system 1 is installed. With this configuration, the EL unit 2 can be attached in any position where the elongated holding frame 3 is installed, and thus a resident can freely arrange illuminated space to be realized by the lighting system 1. For replacement of the EL unit 2, the resident may slide the EL unit 2 along the holding frame 3 after removing either the front cap 51 or the rear cap 52, and detach it from the end of the holding frame 3.

Some of standard panels of building materials for walls and ceilings are 12 mm thick. The holding frame 3 and the EL unit 2 are formed so as to have a thickness of 12 mm or less when the EL unit 2 is held on the holding frame 3. The thickness, 12 mm or less, of the holding frame 3 and the EL unit 2 can prevent the EL unit 2 from protruding when they are incorporated in a building material, and thus can improve the feeling of spaciousness and create a visual effect so that a resident feels the building material (wall) itself is shining.

Figure 8:
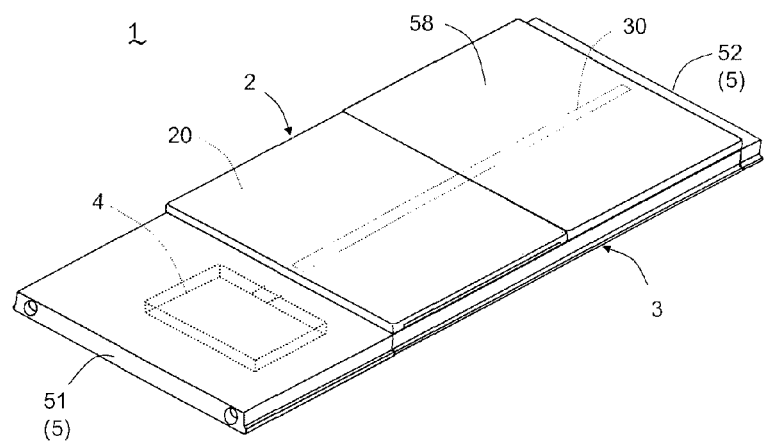
FIG. 8 is an exploded perspective view of a modified example of the lighting system.

On the holding frame 3, the area where the EL unit 2 is not held may be covered with a case unit 58 formed to have the substantially same shape as the EL unit 2 as shown in FIG. 8. This case unit 58 is a so-called dummy case to cover the conductive member 30 and other components of the holding frame 3. By providing it, the appearance of the lighting system 1 can be improved. Other components except for the EL unit 2, e.g. a human sensor, may be mounted in the case unit 58. Like the EL unit 2, this kind of components may be also connected to the control unit 4 through the conductive member 30 of the holding frame 3 and incorporated in the lighting system 1.

Figure 9:
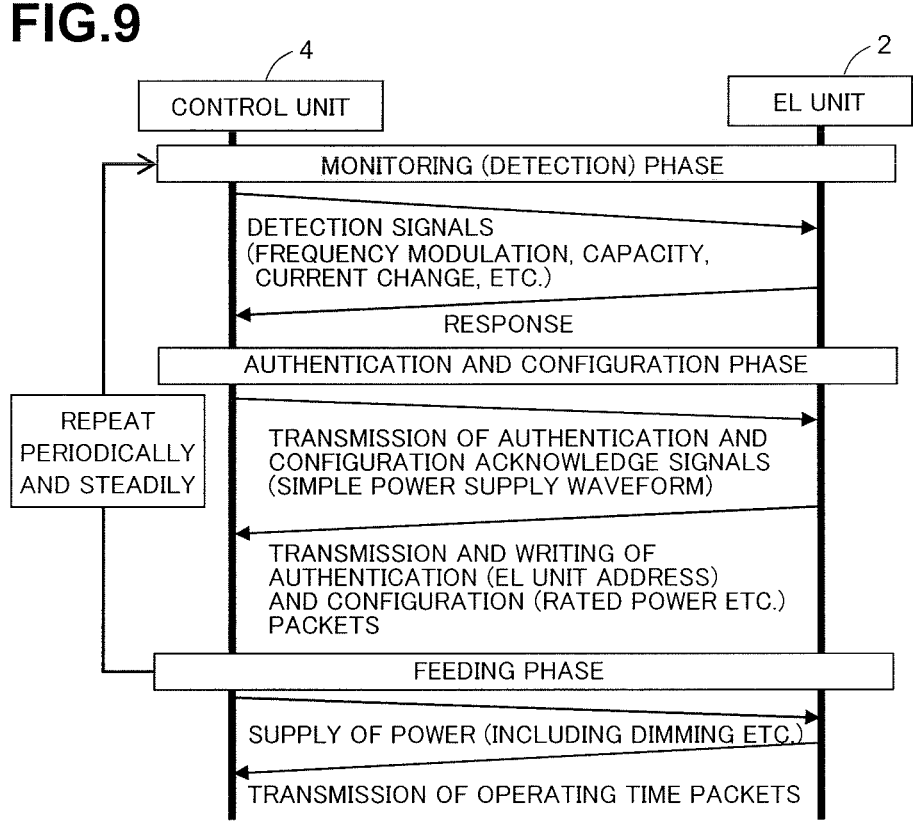
FIG. 9 shows an operation flow of the lighting system.

Referring now to FIGS. 9 to 12 in addition to FIG. 2 described above, the operation pattern of the lighting system 1 of this embodiment is described. As shown in FIG. 9, the lighting system 1 repeats (1) a monitoring (detection) phase, (2) an authentication and configuration phase, and (3) a feeding phase periodically and steadily between the control unit 4 and the EL unit 2, whereby communication and power supply are performed. The monitoring (detection) phase (1) is a phase where the control unit 4 monitors the connection state of the EL unit 2 connected to the conductive member 30 and detects the connection. In this phase, the control unit 4 outputs the detection signals through the conductive member 30. The detection signals contain information such as frequency modulation, power capacity, and current change in communication signals transmitted from the control unit 4. When the EL unit 2 receives the above detection signals through the conductive member 30, it outputs acknowledge signals to the control unit 4. When the control unit 4 receives the acknowledge signals, the lighting system 1 proceeds to (2) authentication and configuration phase. Note that, in the control unit 4, the main controller 42 controls the main transmitter-receiver 43 to perform the transmission and reception of these signals and, in the EL unit 2, the panel controller 21 controls the panel transmitter-receiver 22 to perform it. However, the transmission and reception is described here as being performed by the control unit 4 and the EL unit 2.

Figure 10:
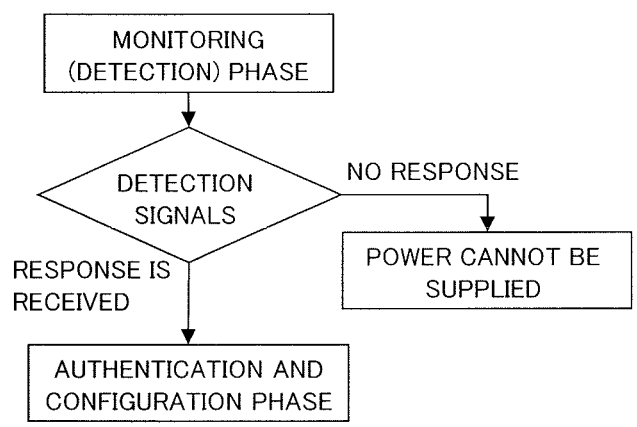
FIG. 10 is a flowchart showing a detailed operation flow of the lighting system.

When EL unit 2 is not held on the holding frame 3 or when the EL unit 2 is not properly connected to the conductive member 30, no acknowledge signal is transmitted from the EL unit 2. Thus, as shown in FIG. 10, when receiving no acknowledge signal within a predetermined period of time after the transmission of detection signals, the control unit 4 determines that power cannot be supplied to the conductive member 30, and proceeds to (2) authentication and configuration phase when receiving acknowledge signals.

Figure 11:
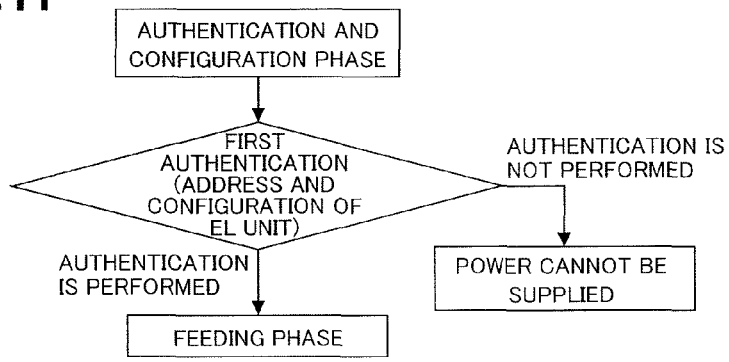
FIG. 11 is a flowchart showing a detailed operation flow of the lighting system.

The (2) authentication and configuration phase is a phase where the control unit 4 recognizes the address and configuration of the EL unit 2 in which the connection state has been checked in the above (1) monitoring (detection) phase. In this phase, acknowledge signals are first output from the control unit 4 through the conductive member 30 to the EL unit 2. In response to the acknowledge signals, the EL unit 2 outputs, to the control unit 4, information such as the address assigned to the EL unit itself and the rated current of the light emitter 20 mounted in the EL unit 2. Such information (packets) are written to the memory (main controller 42) in the control unit 4. When receiving such information, the control unit 4 recognizes that the EL unit 2 is compatible with the lighting system 1. Then, the lighting system 1 proceeds to (3) feeding phase. On the other hand, if a medium connected to the conductive member 30 is present, when the medium is not compatible with the lighting system 1, the above described information is not transmitted or received. In this case, authentication of the EL unit 2 is not performed and, as shown in FIG. 11, the control unit 4 determines that power cannot be supplied to the conductive member 30.

Figure 12:
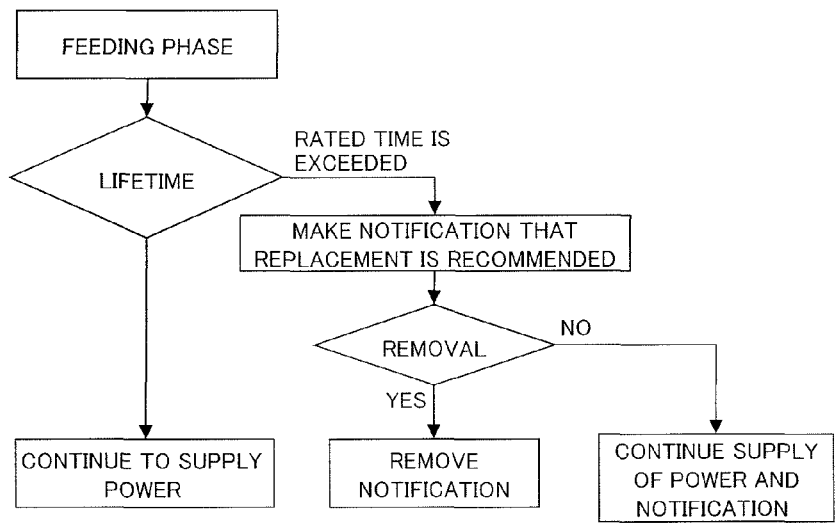
FIG. 12 is a flowchart showing a detailed operation flow of the lighting system.

The (3) feeding phase is a mode where a predetermined direct current is actually supplied from the control unit 2 to turn on the EL unit 2. In this phase, information such as the operating (lighting) time of the light emitter 20 mounted in the EL unit 2 is provided by the EL unit 2. As shown in FIG. 12, the control unit 4 determines whether or not the operating time of the light emitter 20 exceeds the rated run time (lifetime), and if the operating time exceeds the rated run time, the control unit 4 makes a notification that replacement of the EL unit 2 is recommended. For example, this notification is made by causing the EL unit 2, which needs to be replaced, to flash at predetermined intervals. Since the emission lifetime of an organic EL device generally depends on time degradation of the organic material used in the light emitting layer and the luminance gradually decreases, it may be difficult for a resident (administrator) to notice that. Thus, the lighting system 1 notifies the resident of the time for replacement of the EL unit 2 by causing the EL unit 2 to flash, as if a conventional fluorescent lamp is burned out, when the lifetime is exceeded. Then, when the EL unit 2 is detached, the notification is removed. When the EL unit 2 is not detached, the above notification is performed again at predetermined intervals. Further, even if the EL unit 2 is not detached, an administrator can remove the above notification as appropriate or arbitrarily set the notification interval by operating the interface provided on the control unit 4.

Figure 13A:
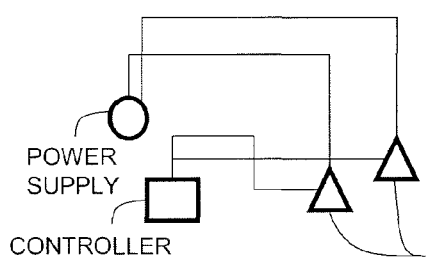
FIG. 13A is a schematic diagram showing the wiring path in a conventional lighting system.
Figure 13B:
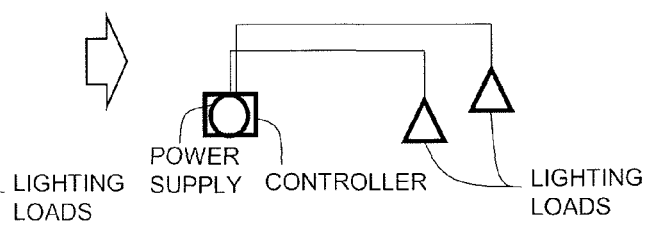
FIG. 13B is a schematic diagram showing the wiring path in the lighting system according to the above embodiment.

In a conventional lighting system, a power supply (○), which supplies power to lighting loads (Δ) such as EL units, and a controller (□), which transmits and receives communication signals such as control information for the lighting loads, are provided separately and connected to the lighting loads in different paths as shown in FIG. 13(a). In this case, space for wiring of both a power supply line and an information line is needed inside a wall or ceiling, and for securing the space, the residential space may be limited. Further, since the wiring is complicated, special skills and man-hours are needed for the installation. On the other hand, in the lighting system 1 of this embodiment, the control unit 4 and the EL unit 2 are electrically connected through the conductive member 30 provided on the holding frame 3, which holds the EL unit 2, and power and communication information are transmitted through the conductive member 30 between the units (see FIG. 1 and FIG. 2). More particularly, as shown in FIG. 13(b), a power supply (○), which supplies power to lighting loads (Δ) such as EL units, and a controller (□), which transmits and receives communication signals such as control information for the lighting loads, are integrated. Further, they are connected to the lighting loads in the same path. Moreover, since the conductive member 30 provided on the holding frame 3, which holds the EL unit 2, serves as the wiring, the space for wiring as needed in the conventional system is not required and thus spacious residental space can be realized. Further, simply by fixing the holding frame 3 to a mounting surface and attaching the EL unit 2 and the control unit 4 to the holding frame 3, they are connected. Therefore, without special skills, a resident can install the lighting system 1 as appropriate and can easily replace the EL unit 2.

Further, a conventional power supply line only continuously applies a constant voltage to a lighting load while an information line only provides simple instructions for on/off of electricity, dimming, and so on. Therefore, in a lighting system with advanced functionality where lighting effects can be achieved using multiple lighting loads, particular settings for each lighting load needs to be made at the time of installation. For the settings, certain know-how and skill are required for the installation, and it is not easy to use this kind of lighting system in an ordinary house, office, or the like. On the other hand, in the lighting system 1 of this embodiment, a power supply line and an information line are integrated into signals from the single control unit 4, and detailed dimming control of each EL unit 2 is performed by the panel controller 21 (see FIG. 2) provided in the EL unit 2 on the terminal side. Accordingly, it is not necessary to make particular settings for each EL unit 2, and thus even an end user, who does not have the know-how, can easily install and replace the EL unit 2.

Further, in the lighting system 1 of this embodiment, the conductive member 30 is formed at the center of the holding frame 3 along the longitudinal direction. As compared to a configuration where a conductive member 30 (a positive electrode wire and a negative electrode wire) is formed at the two edge portions 33 of a holding frame 3, this configuration reduces the distance between the electrode wires and thus can reduce noise generation. Moreover, even in the case where multiple holding frames 3 are arranged at regular intervals on a mounting surface, conductive members 30 provided on adjacent holding frames 3 are avoided from nearing to each other, so that a certain distance therebetween can be secured. Thus, when power and communication information are transmitted, they are less likely to be affected by noise from another conductive member 30, so that the control unit 4 can stably control the lighting of the EL unit 2.

Figure 14:
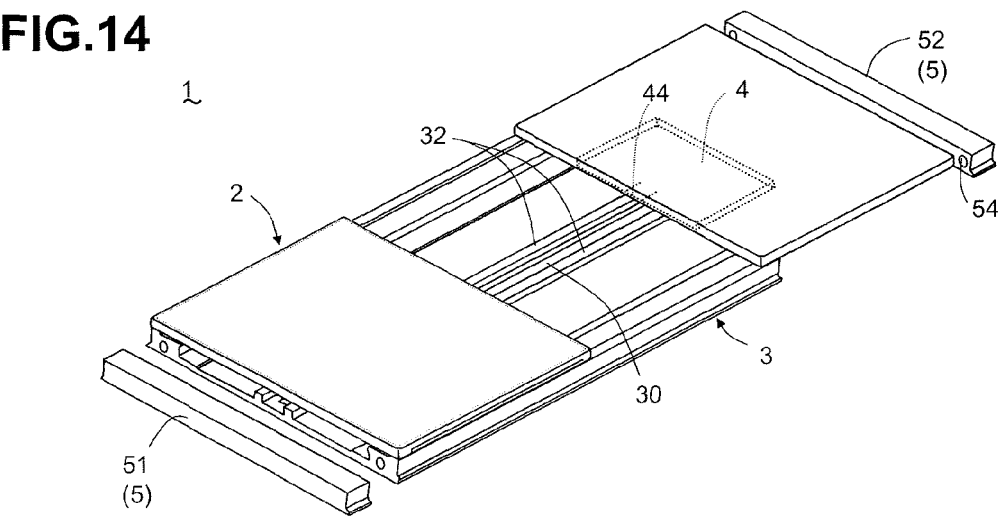
FIG. 14 is an exploded perspective view of a modified example of the lighting system.
Figure 15:
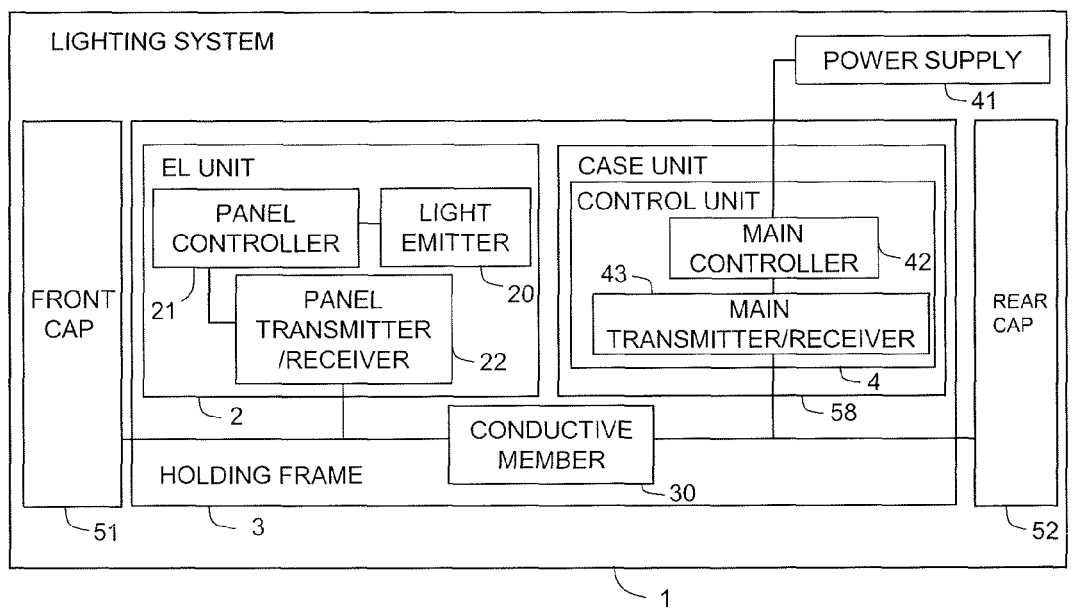
FIG. 15 is a block diagram of the modified example.

Referring to FIG. 14 and FIG. 15, a lighting system according to a modified example of this embodiment is described. As shown in FIG. 14, in the lighting system 1 according to this modified example, the area on a holding frame 3 where an EL unit 2 is not held is covered with a case unit 58, like the configuration shown in FIG. 8 described above, and a control unit 4 is mounted in the case unit 58. A front cap 51 is attached to an end of the holding frame 3 to isolate and protect the end of a conductive member 30, and a member similar to the above described rear cap 52 is used. Further, as shown in FIG. 15, a power supply 41 is provided outside the control unit 4. The other configuration is similar to that of the above described embodiment.

Since the control unit 4 is mounted in the case unit 58 held on the holding frame 3, this modified example is preferable in the case where a mounting surface has no space for arranging a front cap 51, which has the size shown in the above described embodiment, in the direction of the end of the holding frame 3. Further, in this modified example, since the power supply 41 is located away from the holding frame 3 and the EL unit 2, the holding frame 3 and the EL unit 2 are less likely to be affected by heat from the power supply 41.

Figure 16:
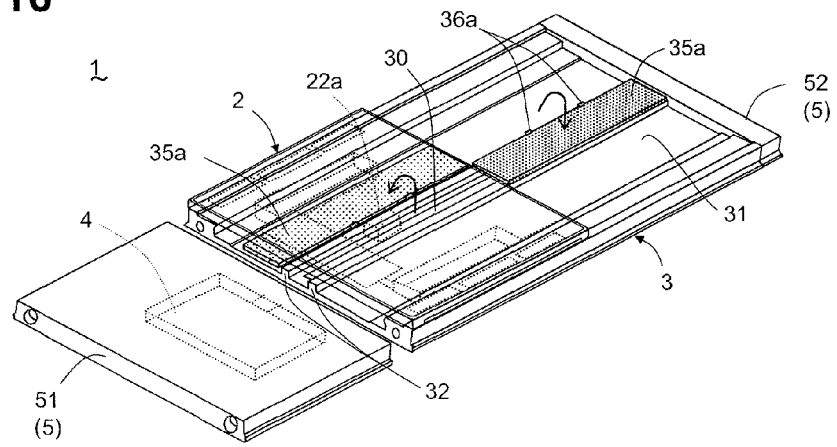
FIG. 16 is a partially exploded perspective view of another modified example of the lighting system.
Figure 17:
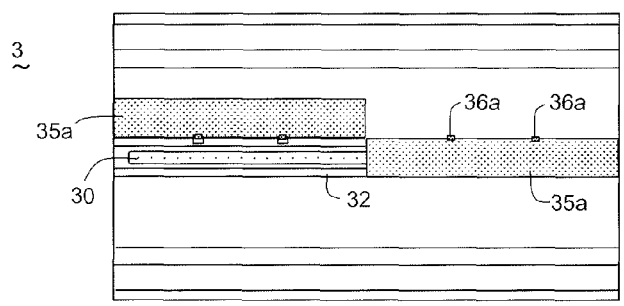
FIG. 17 is a top view of a holding frame used in the modified example.
Figure 18A:
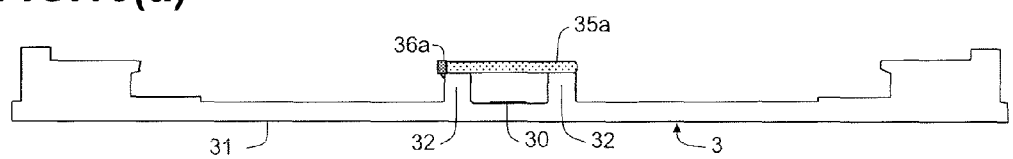
FIGS. 18A and 18B are side views of the modified example viewed from its end.
Figure 18B:
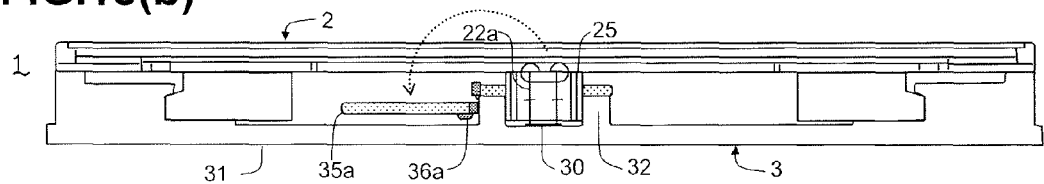

Referring to FIG. 16 to FIG. 18, a lighting system according to another modified example of this embodiment is described. As shown in FIG. 16 and FIG. 17, a holding frame 3 in the lighting system 1 according to this modified example includes a cover member 35*a* that is disposed over a conductive member 30 and is movable. In this modified example, one of a pair of linear projections 32 is provided with a hinge mechanism 36*a*. Through the hinge mechanism 36*a*, the cover member 35*a* is disposed so as to cover the upper surfaces of the pair of linear projections 32 as well as the conductive member 30. The hinge mechanism 36*a* causes the cover member 35*a* to be pivotable in a direction perpendicular to the longitudinal direction of the holding frame 3. The hinge mechanism 36*a* is biased by a spring member mounted therein (not shown) and causes the cover member 35*a* to rest at the position where the conductive member 30 is covered. When the cover member 35*a* is pivoted against the bias direction, the conductive member 30 is exposed with respect to an EL unit 2.

In this modified example, when the EL unit 2 is not held on the holding frame 3, the cover member 35*a* is positioned to cover the conductive member 30 as shown in FIG. 18(*a*). Then, an installation worker pivots the cover member 35*a* by a finger and, in this state, slides and inserts the EL unit 2 from the end of the holding frame 3. Thereby, the EL unit 2 is held on the holding frame 3 while the feeding terminal 22*a* of the EL unit 2 and the conductive member 30 are electrically connected as shown in FIG. 18(*b*). In place of the hinge mechanism 36*a*, a slide mechanism, which moves the cover member 35*a* horizontally, may be provided.

With this configuration, since the area on the holding frame 3 where the EL unit 2 is not held is covered with the cover member 35*a* as shown in FIG. 16 described above, the conductive member 30 can be protected from dust and the like. Further, the area on the holding frame 3, where the EL unit 2 is not held, is not necessary to be covered with a dummy case unit 58 as shown in FIG. 8 described above. By using it together with the cover member 35*a* in this modified example, the conductive member 30 can be more reliably protected from dust and the like.

Figure 19:
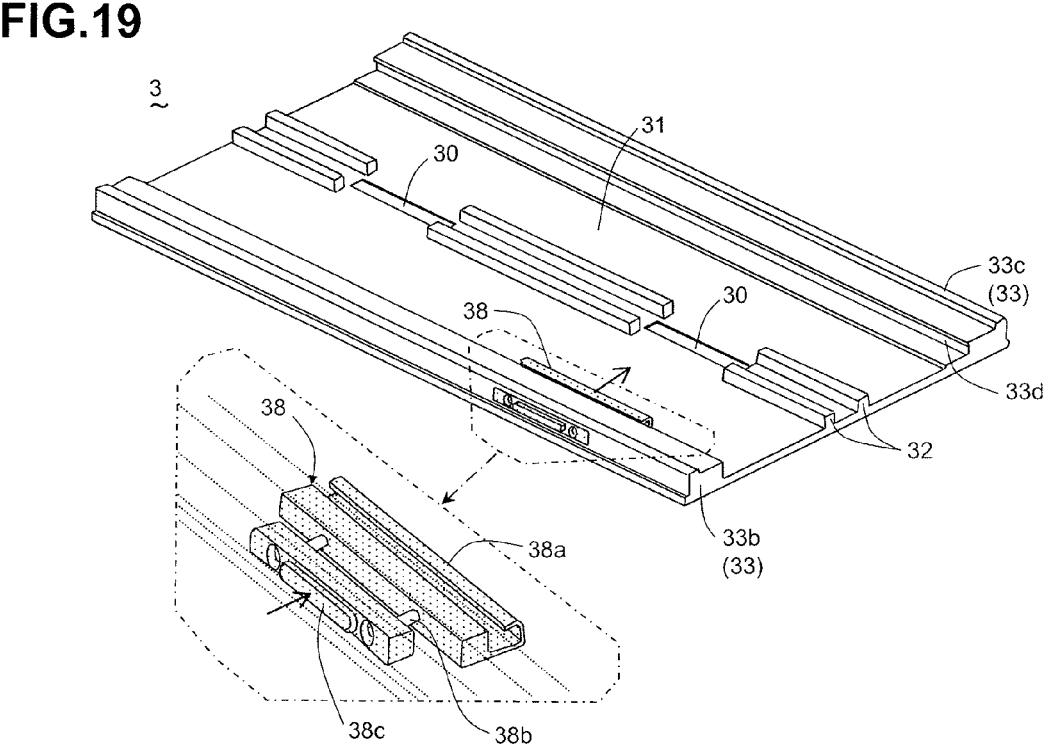
FIG. 19 is a perspective view of a holding frame used in a lighting system according to a second embodiment of the present invention.
Figure 20:
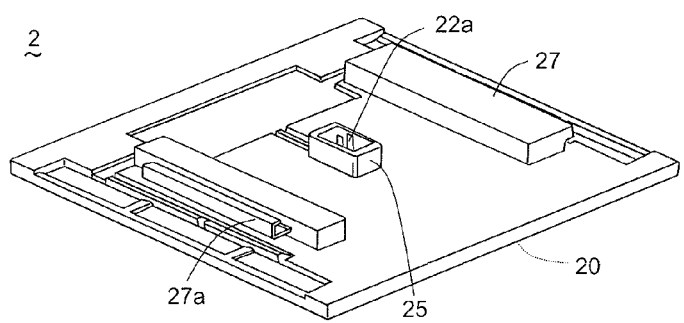
FIG. 20 is a perspective view of an EL unit used in the lighting system.
Figure 21A:
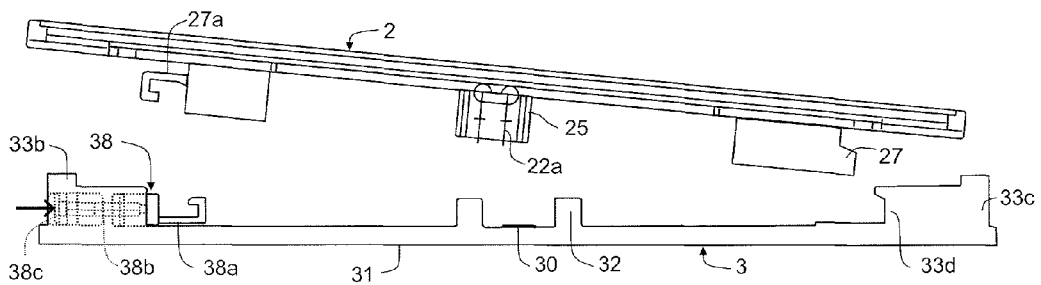
FIGS. 21A and 21B are side views of the lighting system viewed from its end.
Figure 21B:
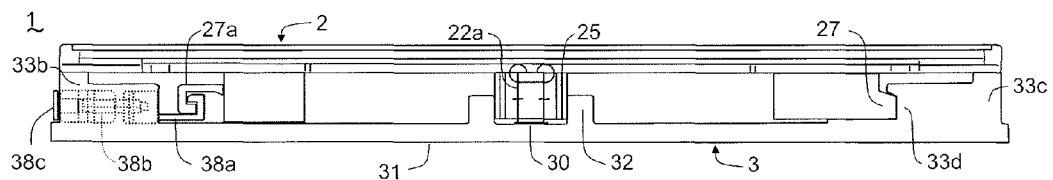

Referring now to FIGS. 19 to 21, a lighting system according to a second embodiment of the present invention is described. As shown in FIG. 19, a holding frame 3 in the lighting system 1 of this embodiment has an elongated shape and includes a hook 38 formed on an edge portion 33*b* (one of two edge portions 33) along its longitudinal direction and a recess 33*d* formed in an edge portion 33*c* (the other of two edge portions 33). The hook 38 is partially embedded in the edge portion 33*b* and is configured to be slidable while being biased in a direction perpendicular to the longitudinal direction of the holding frame 3. Further, the hook 38 includes a hook portion 38*a* exposed toward the inside of the edge portion 33*b*, a biasing spring 38*b* that biases the hook portion 38*a* toward the edge portion 33*b* of the holding frame 3, and a push button 38*c* exposed toward the outside of the edge portion 33*b*. Further, a conductive member 30 is embedded in a fixed surface 31, and only part of the member that corresponds to the area where an EL unit 2 is mounted is exposed. In an area adjacent to the exposed portion of the conductive member 30, there is no linear projection 32 of the holding frame 3.

Corresponding to the above holding frame 3, the EL unit 2 in the lighting system 1 of this embodiment includes a hooked portion 27*a*, which is to be engaged with the hook 38, on the surface thereof facing the holding frame 3 as shown in FIG. 20. The other configuration is similar to that of the first embodiment described above.

Next, how to mount the EL unit 2 on the holding frame 3 in this embodiment is described. First, as shown in FIG. 21(*a*), the push button 38*c* at the edge portion 33*b* of the holding frame 3 is pressed to slide the hook portion 38*a* toward the conductive member 30. In this state, the projection 27 of the EL unit 2 is pushed into the recess 33*d* of the holding frame 3 for engagement while the hooked portion 27*a* is engaged with the hook portion 38*a* of the hook 38. Then, when the push button 38*c* is released, the hook portion 38*a* is pulled toward the edge portion 33*b* by the biasing spring 38*b* and, as shown in FIG. 21(*b*), the hooked portion 27a of the EL unit 2 and the hook portion 38a of the hook 38 are connected. Thereby, the EL unit 2 is held on the holding frame 3. Since the linear projection 32 of the holding frame 3 is not formed in the area adjacent to the guide block 25 of the EL unit 2 (see FIG. 19), there is no contact between the guide block 25 and the linear projection 32 when the EL unit 2 is mounted, so that the projection 27 of the EL unit 2 can be smoothly pushed into the recess 33d of the holding frame 3. The recess 33d may be provided with an elastic member (not shown) for prevention of backlash. In order to remove the EL unit 2 from the holding frame 3, the hook portion 38a of the hook 38 and the hooked portion 27a are disengaged by pressing the push button 38c like the mounting process described above. In this state, by raising the end of the EL unit 2 that is provided with the hooked portion 27a, the EL unit 2 can be easily removed from the holding frame 3.

This configuration allows the EL unit 2 to be easily attached to and removed from the holding frame 3 without removing the front cap 51 or the rear cap 52 (see FIG. 1) from the holding frame 3.

Figure 22:
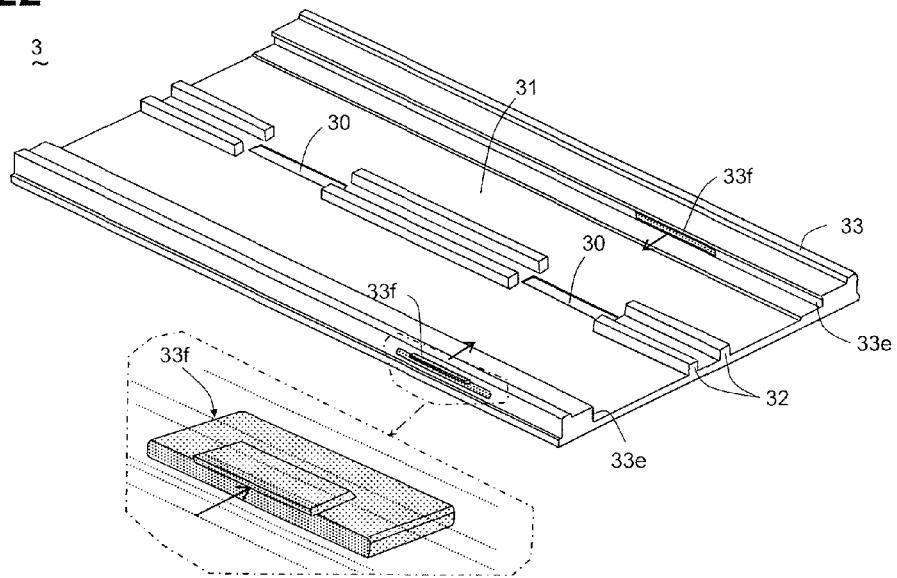
FIG. 22 is a perspective view of a holding frame used in a lighting system according to a third embodiment of the present invention.
Figure 23:
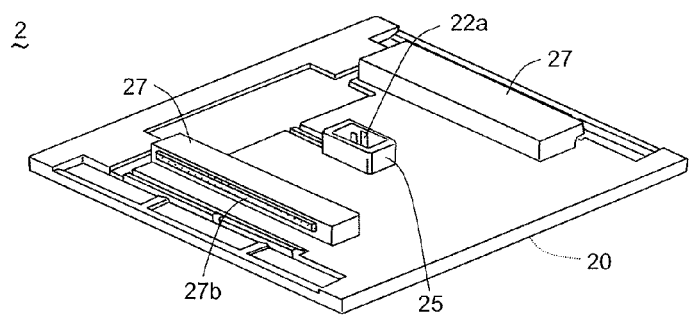
FIG. 23 is a perspective view of an EL unit used in the lighting system.

Referring now to FIGS. 22 to 24, a lighting system according to a third embodiment of the present invention is described. As shown in FIG. 22, a holding frame 3 in the lighting system 1 of this embodiment has an elongated and includes a pair of recesses 33e formed in two edge portions 33 along the longitudinal direction. In each of the recesses 33e, a push tool 33f is embedded. This push tool 33f is formed so that it can only slide inward from the edge portion 33 of the holding frame 3.

Further, an EL unit 2 includes a pair of projections 27, which is to be engaged with the recesses 33e of the holding frame 3, on the surface facing the holding frame, and one of the pair of projections 27 is configured to be slidable while being biased in a direction perpendicular to the longitudinal direction of the holding frame 3. More particularly, as shown in FIG. 23, the one of the projections 27 is provided with a protrusion 27b that protrudes toward one of the pair of recesses 33e of the holding frame 3, and the protrusion 27b can slide while being biased in the protruding direction. The other configuration is similar to that of the second embodiment described above.

Figure 24A:
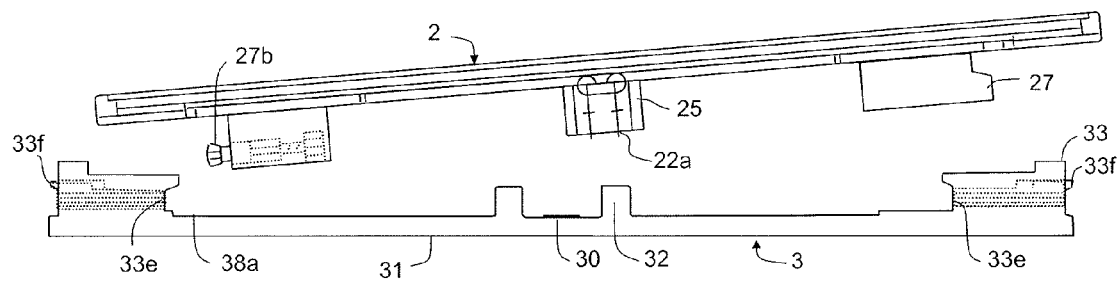
FIGS. 24A and 24B are side views of the lighting system viewed from its end.
Figure 24B:
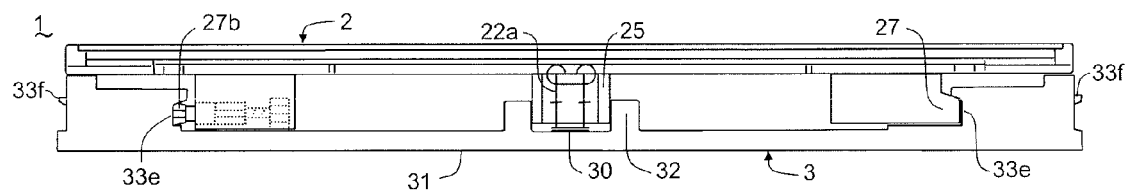

Next, how to mount the EL unit 2 on the holding frame 3 in this embodiment is described. First, as shown in FIG. 24(a), the protrusion 27b of the EL unit 2 is inserted in the one of recesses 33e of the holding frame 3 while the EL unit 2 is slightly inclined. Then, as shown in FIG. 24(b), the other projection 27 is engaged with the other of recesses 33e of the holding frame 3 while the protrusion 27b is pushed in the direction opposite to the biasing direction. When the installation worker releases the hand from the EL unit 2, a repulsive force is generated between the protrusion 27b and the recess 33e by the spring biasing. This repulsive force acts in a direction so that the projections 27 of the EL unit 2 push the pair of recesses 33e of the holding frame, which are opposite, and expand therebetween. Thereby, the EL unit 2 is held on the holding frame 3. In order to remove the EL unit 2 from the holding frame 3, the projection 27 (protrusion 27b) of the EL unit 2 and the recess 33e are disengaged by pressing the push tool 33f. In this state, by raising the end provided with the projection 27 (protrusion 27b) that faces the pressed push tool 33f, the EL unit 2 can be easily removed from the holding frame 3.

Like the second embodiment described above, this configuration allows the EL unit 2 to be easily attached to and removed from the holding frame 3 without removing a front cap 51 or an rear cap 52 (see FIG. 1) from the holding frame 3.

Figure 25:
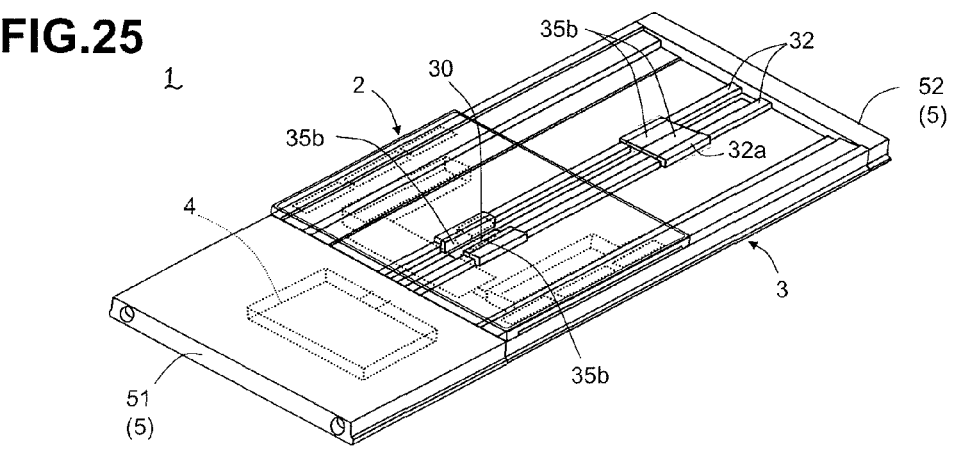
FIG. 25 is an exploded perspective view of a modified example of the lighting system.
Figure 26:
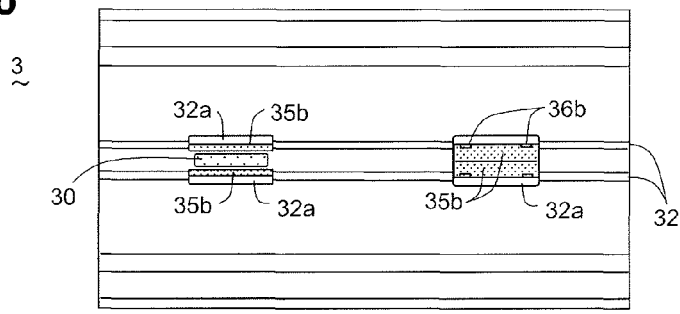
FIG. 26 is a top view of a holding frame used in the modified example.

Referring to FIGS. 25 to 27, a lighting system according to a modified example of this embodiment is described. As shown in FIG. 25 and FIG. 26, in the lighting system 1 according to this modified example, a conductive member 30 is covered with a cover member 35b of which double doors are opened from its center. In this modified example, a pair of linear support projections 32a is provided on both sides of the exposed portion of the conductive member 30, and the distance between the pair of linear support projections 32a is slightly larger than the distance between a pair of linear projections 32a. The double doors of cover members 35b are pivotally supported by hinge mechanisms 36b provided respectively on the upper surfaces of the linear support projections 32a. The hinge mechanisms 36b are configured to bias the cover members 35b into the closed positions by spring. The other configuration is similar to that of the third embodiment described above.

Figure 27A:
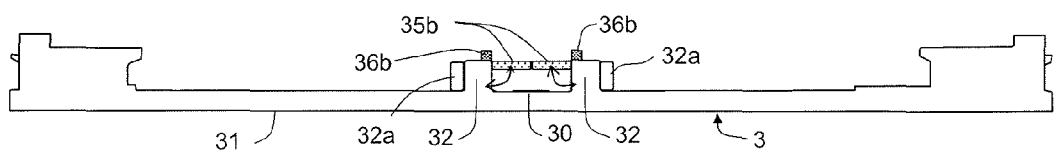
FIGS. 27A and 27B are side views of the modified example viewed from its end.
Figure 27B:
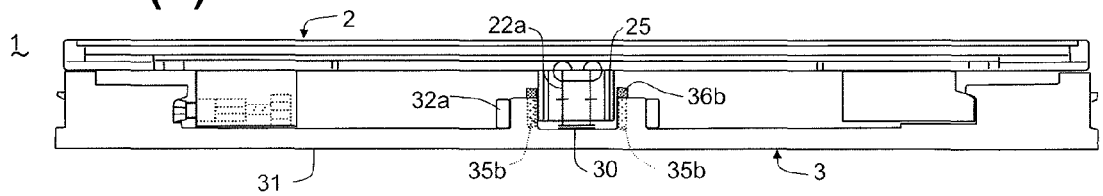

In this modified example, when no EL unit 2 is attached to the holding frame 3, the conductive member 30 is covered with the cover members 35b by the spring biasing of the hinge mechanisms 36b as shown in FIG. 27(a). When an EL unit 2 is attached to the holding frame 3, a guide block 25 of the EL unit 2 presses down the cover member 35b, so that the cover member is parallel to the inner faces of the linear support projections 32a as shown in FIG. 27(b).

Like the modified example shown in FIG. 16 described above, this configuration allows the conductive member 30 to be protected from dust and the like because the conductive member 30 at a place on the holding frame 3 where the EL unit 2 is not held is covered with the cover members 35b.

Figure 28:
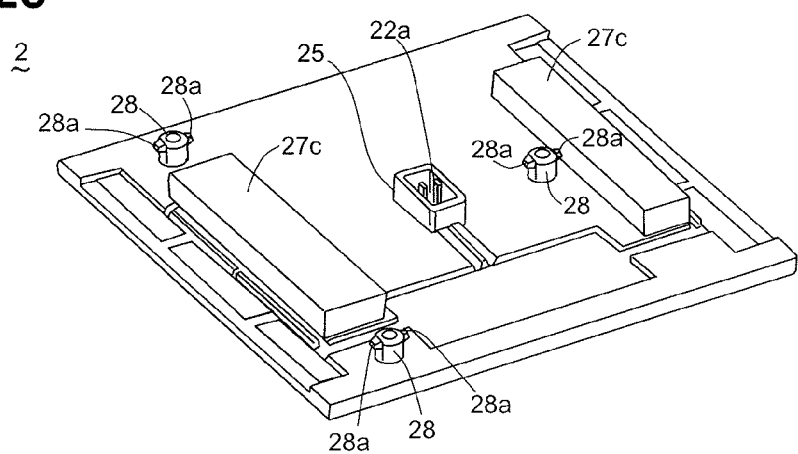
FIG. 28 is a perspective view of an EL unit used in a lighting system according to a fourth embodiment of the present invention.
Figure 29:
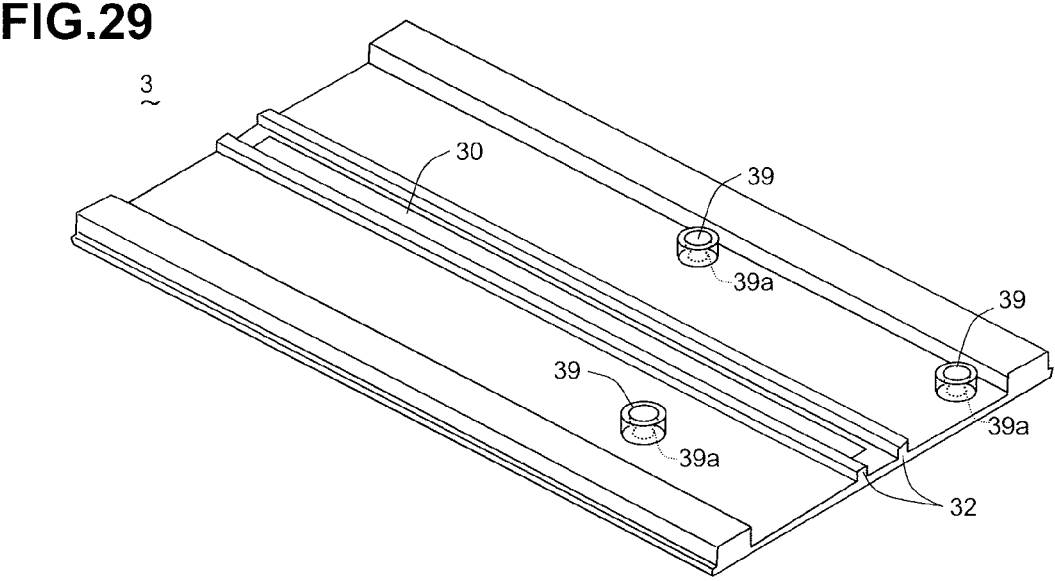
FIG. 29 is a perspective view of a holding frame used in the lighting system.
Figure 30A:
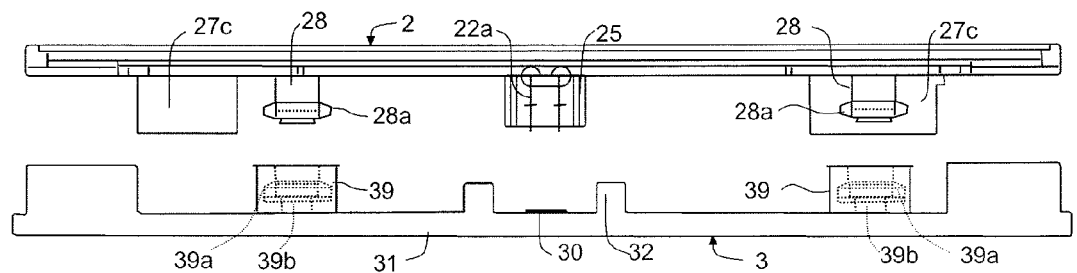
FIGS. 30A and 30B are side views of the lighting system viewed from its end.
Figure 30B:
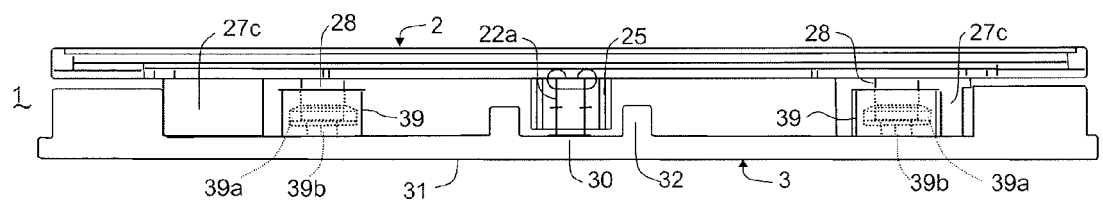

Referring now to FIGS. 28 to 30, a lighting system according to a fourth embodiment of the present invention is described. As shown in FIG. 28, an EL unit 2 in the lighting system 1 of this embodiment includes a fixed portion 28, which protrudes toward a holding frame 3, on the surface of the EL unit 2 facing the holding frame 3. The fixed portion 28 has a pair of claws 28a that can slide while being biased in directions perpendicular to the protruding direction. The fixed portion 28 is cylindrical in shape, and the pair of claws 28a is arranged so as to protrude symmetrically from the outer surface of the tip end of the fixed portion 28 and is biased in opposite directions. The claws 28a are formed so as to be tapered in the protruding directions. On both edges of the EL unit 2, support blocks 27c are formed. The support block 27c comes in contact with a fixed surface 31 of the holding frame 3 and maintains a relative position between the holding frame 3 and the EL unit 2 in the thickness direction.

On the other hand, the holding frame 3 has a receiving portion 39, in which the claws 28a are to be received, at a position corresponding to the fixed portion 28 of the EL unit 2 as shown in FIG. 29. The receiving portion 39 is a cylindrical member whose inner diameter is larger than the outer diameter of the fixed portion 28 and is smaller than the distance between the tips of the pair of claws 28a biased. Further, in the inner periphery of the receiving portion 39, a recess 39a in which the claw 28a is caught is formed (see FIG. 30). The recess 39a is tapered to correspond to the shape of the claw 28a. Further, the part of the receiving portion 39, which is in contact with the fixed surface 31, is also provided with a spring 39b (FIG. 30(b)). In this embodiment, there is no linear recess 33a in two edge portions 33 of the holding frame 3. The other configuration is similar to that of the first embodiment described above.

Next, how to mount the EL unit 2 on the holding frame 3 in this embodiment is described. First, as shown in FIG. 30(*a*), the back surface of the EL unit 2 is positioned to face a front surface of the holding frame 3 to which the EL unit 2 is to be attached. Then, the EL unit 2 is pressed down in a direction perpendicular to the holding frame 3. Since the claw 28*a* is formed to have the tapered shape, the claw 28*a* is pressed into the fixed portion 28 when it comes in contact with the opening of the cylindrical receiving portion 39. Then, when the EL unit 2 is further pressed toward the holding frame 3 and the claw 28*a* reaches the recess 39*a*, repulsive force is generated, by the spring biasing, in a direction so that the pair of claws 28*a* pushes the inside of the recess 39*a* outward. As shown in FIG. 30(*b*), the claws 28*a* of the fixed portion 28 are engaged with the recess 39*a* of the receiving portion 39 by the repulsive force. Thereby, the EL unit 2 is held on the holding frame 3. Preferably, in this embodiment, three fixed portions 28 and three receiving portions 39 are provided so that the planar EL unit 2 can be stably held. In order to remove the EL unit 2 from the holding frame 3, the EL unit 2 is further pressed toward the holding frame 3 once. Thereby, the claw 28*a* and the recess 39*a* are disengaged by the reaction of the spring 39*b* provided in the receiving portion 39, so that the fixed portion 28 is removed from the receiving portion 39.

Like the second and third embodiments described above, this configuration allows the EL unit 2 to be easily attached to and removed from the holding frame 3 without removing the front cap 51 or the rear cap 52 (see FIG. 1) from the holding frame 3.

Figure 31:
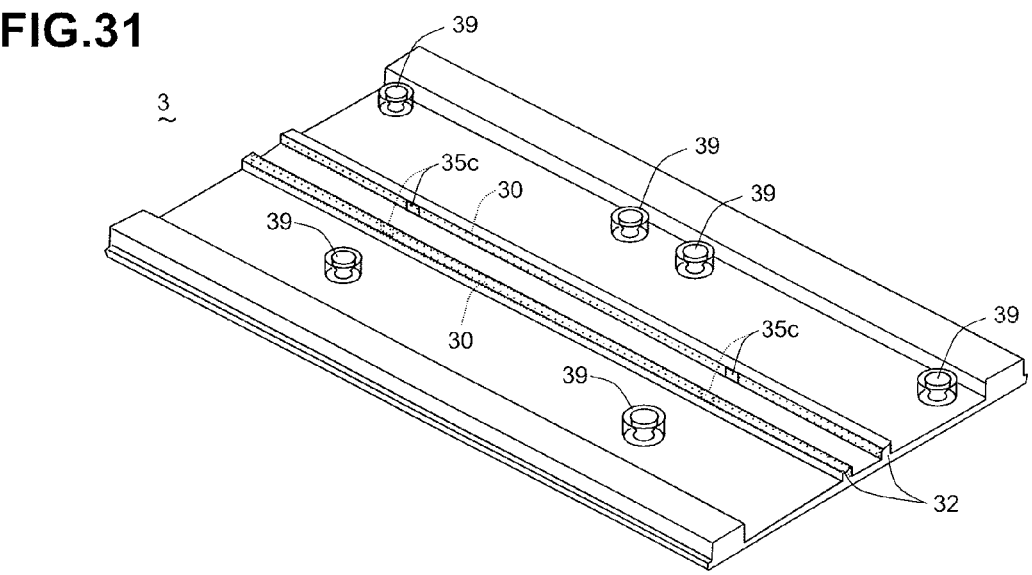
FIG. 31 is a perspective view of a holding frame used in a modified example of the lighting system.
Figure 32A:
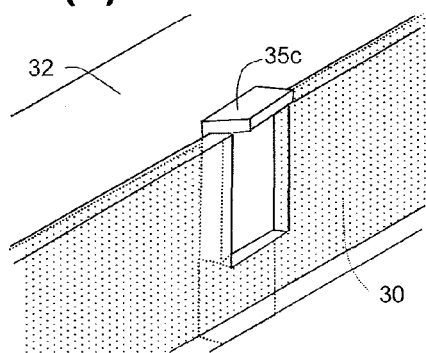
FIGS. 32A and 32B are partially enlarged views of the holding frame.
Figure 32B:
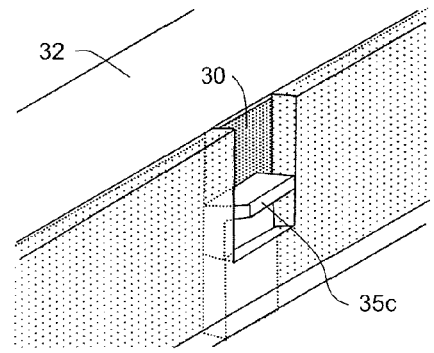
Figure 33:
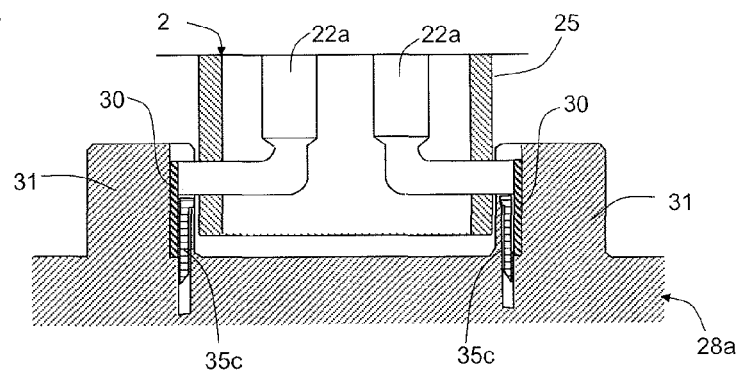
FIG. 33 is an enlarged end view of a conductive member and a feeding terminal in the modified example.

Referring to FIGS. 31 to 33, a lighting system according to a modified example of this embodiment is described. As shown in FIG. 31, in the lighting system 1 according to this modified example, conductive members 30 are provided to be embedded in inner surfaces of a pair of linear projections 32, which face each other. The conductive member 30 is partially exposed on the inner surface of the linear projection 32, and a cover member 35*c* is disposed at the exposed portion. The structure for holding an EL unit 2 on the holding frame 3 is similar to that in the fourth embodiment described above. As shown in FIGS. 32(*a*) and 32(*b*), the cover member 35*c* is parallel to the inner surface of the linear projection 32 and is configured to be slidable while being biased in a direction perpendicular to the fixed surface 31. Further, the upper end of the cover member 35*c* is bent in a flange shape.

As shown in FIG. 33, a feeding terminal 22*a* of the EL unit 2 is bent toward the side of a guide block 25 to form an L shape, and its tip end protrudes from the side surface of the guide block 25. In this modified example like the fourth embodiment described above, when the EL unit 2 is pressed perpendicularly to the holding frame 3, the feeding terminal 22*a* comes in contact with the upper end of the cover member 35*c* and slides the cover member 35*c*, whereby the exposed conductive member 30 and the feeding terminal 22*a* are electrically connected.

Like the modified examples shown in FIG. 16 and FIG. 25 described above, this configuration allows the conductive member 30 to be protected from dust and the like because the conductive member 30 at the place on the holding frame 3 where the EL unit 2 is not held is covered with the cover member 35*c*.

Figure 34:
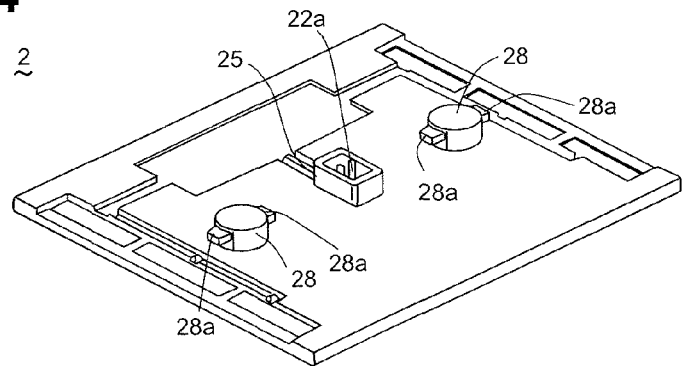
FIG. 34 is a perspective view of an EL unit used in a lighting system according to a fifth embodiment of the present invention.

Referring now to FIGS. 34 to 37, a lighting system according to a fifth embodiment of the present invention is described. As shown in FIG. 34, an EL unit 2 in the lighting system 1 of this embodiment includes a fixed portion 28, which protrudes toward a holding frame 3, on the surface of the EL unit 2 facing the holding frame 3. Like the fourth embodiment described above, the fixed portion 28 has a pair of claws 28*a* that can slide while being biased in directions perpendicular to the protruding direction.

Figure 35:
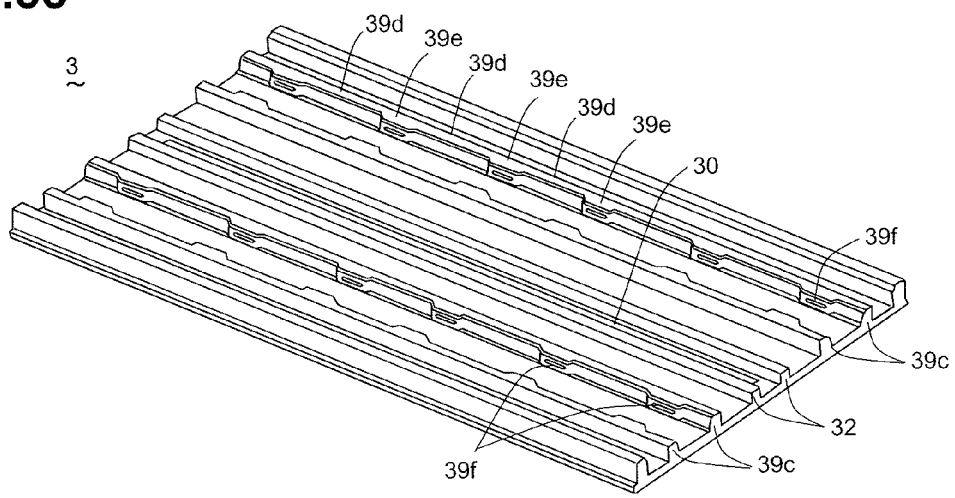
FIG. 35 is a perspective view of a holding frame used in the lighting system.

As shown in FIG. 35, the holding frame 3 has an elongated shape and includes a linear receiving portion 39*c* that extends to both ends of the holding frame 3 in the longitudinal direction and is engaged with the claws 28*a* of the EL unit 2. On one side of the linear receiving portion 39*c*, a number of recesses 39*d* and protrusions 39*e* are formed continuously. Connecting surfaces between the recesses 39*d* and the protrusions 39*e* are inclined and corners connecting between the surfaces are gently rounded. Further, a pair of the linear receiving portions 39*c*, which is arranged so that the recesses 39*d* and the protrusions 39*e* face each other, is respectively formed between a conductive member 30 and two edge portions 33.

Figure 36:
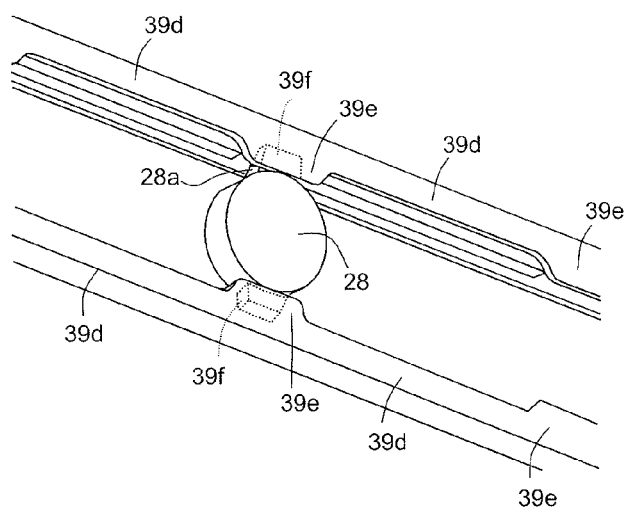
FIG. 36 is an enlarged perspective view of a fixed portion and a linear receiving portion that are used in the lighting system.

As shown in FIG. 36, the relative position of the linear receiving portions 39*c* is designed so that the distance between the opposite recesses 39*d* is slightly larger than the distance between the tips of the pair of claws 28*a* biased and that the distance between the opposite protrusions 39*e* is slightly larger than the outer shape of the fixed portion 28. Further, in the protrusion 39*e*, there is a groove 39*f* that receives the claw 28*a*.

Figure 37A:
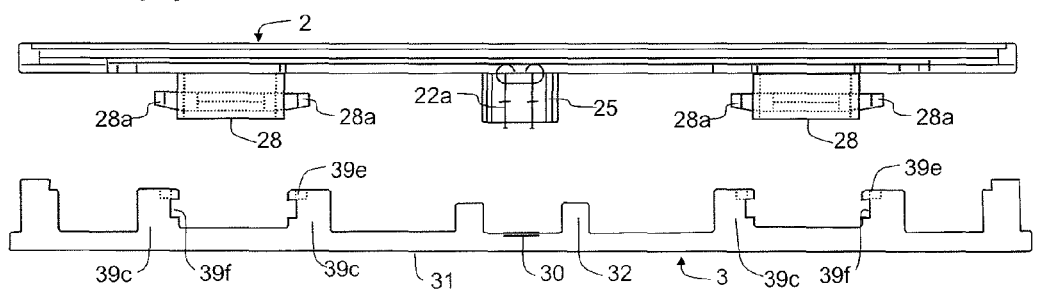
FIGS. 37A and 37B are side views of the lighting system viewed from its end.
Figure 37B:
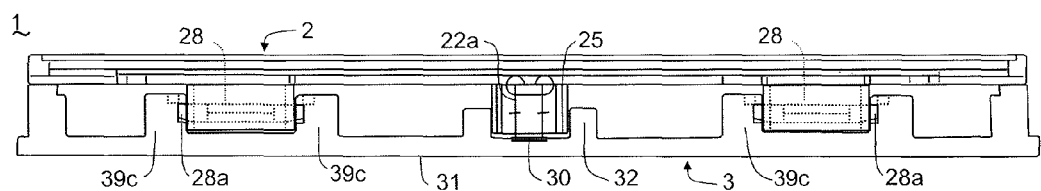

How to mount the EL unit 2 on the holding frame 3 in this embodiment is described. First, the EL unit 2 is faced with the holding frame 3 so that the fixed portion 28 is positioned between opposite recesses 39*d* of the pair of linear receiving portions 39*c*. In the example shown in FIG. 37(*a*), assume that the EL unit 2 is located behind the end of the holding frame 3, so that the protrusions 39*e* and the claws 28*a* are not faced with each other. Then, the EL unit 2 is moved toward the holding frame 3 so that the fixed portion 28 is inserted between opposite recesses 39*d*. Subsequently, the EL unit 2 is slid along the longitudinal direction of the holding frame 3. When the claws 28*a* of the fixed portion 28 climb on the protrusions 39*e* and the EL unit 2 is further slid, the claws 28*a* are inserted into the grooves 39*f* formed in the protrusions 39*e* by the spring biasing, so that the claws 28*a* can be engaged with the grooves 39*f* as shown in FIG. 37(*b*). Thereby, the EL unit 2 is held on the holding frame 3. In order to remove the EL unit 2 from the holding frame 3, the claws 28*a* are removed from the grooves 39*f* by further sliding the EL unit 2 along the longitudinal direction of the holding frame 3. Then, the protrusion 39*e* is moved to between the recesses 39*d* again and the EL unit 2 is pulled out vertically from the holding frame 3, whereby the EL unit 2 can be removed from the holding frame 3.

Like the second to fourth embodiments described above, this configuration allows the EL unit 2 to be easily attached to and removed from the holding frame 3 without removing the front cap 51 or the rear cap 52 (see FIG. 1) from the holding frame 3. Further, like the second to fourth embodiments described above, this configuration allows the EL unit 2 to be slid in the longitudinal direction of the holding frame 3 so that the EL unit 2 can be held in an appropriate position where the protrusions 39*e* and the grooves 39*f* are formed.

Figure 38:
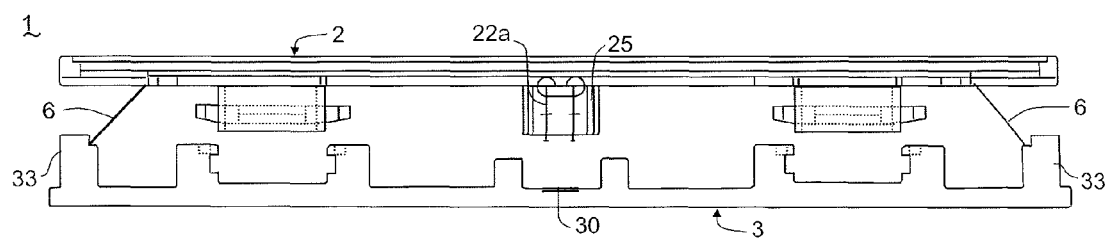
FIG. 38 is an end view of a lighting system according to a sixth embodiment of the present invention.

Referring now to FIG. 38, a lighting system according to a sixth embodiment of the present invention is described. In the lighting system 1 of this embodiment, an EL unit 2 and a holding frame 3 are connected by a wire 6. At both edges of the EL unit 2 and both edges of the holding frame 3, wire holes (not shown) are formed so as not to interfere with the mounting of the EL unit 2 on the holding frame 3. The wire 6 is passed through the wire holes and locked with a key or the like. The other configuration is similar to those of the first to fifth embodiments described above. In the figure, the configuration described in the fifth embodiment is shown only as an example. This configuration allows the EL unit 2 to be easily removed from the holding frame 3 and can prevent the EL unit 2 from being stolen while being simple in structure.

Figure 39:
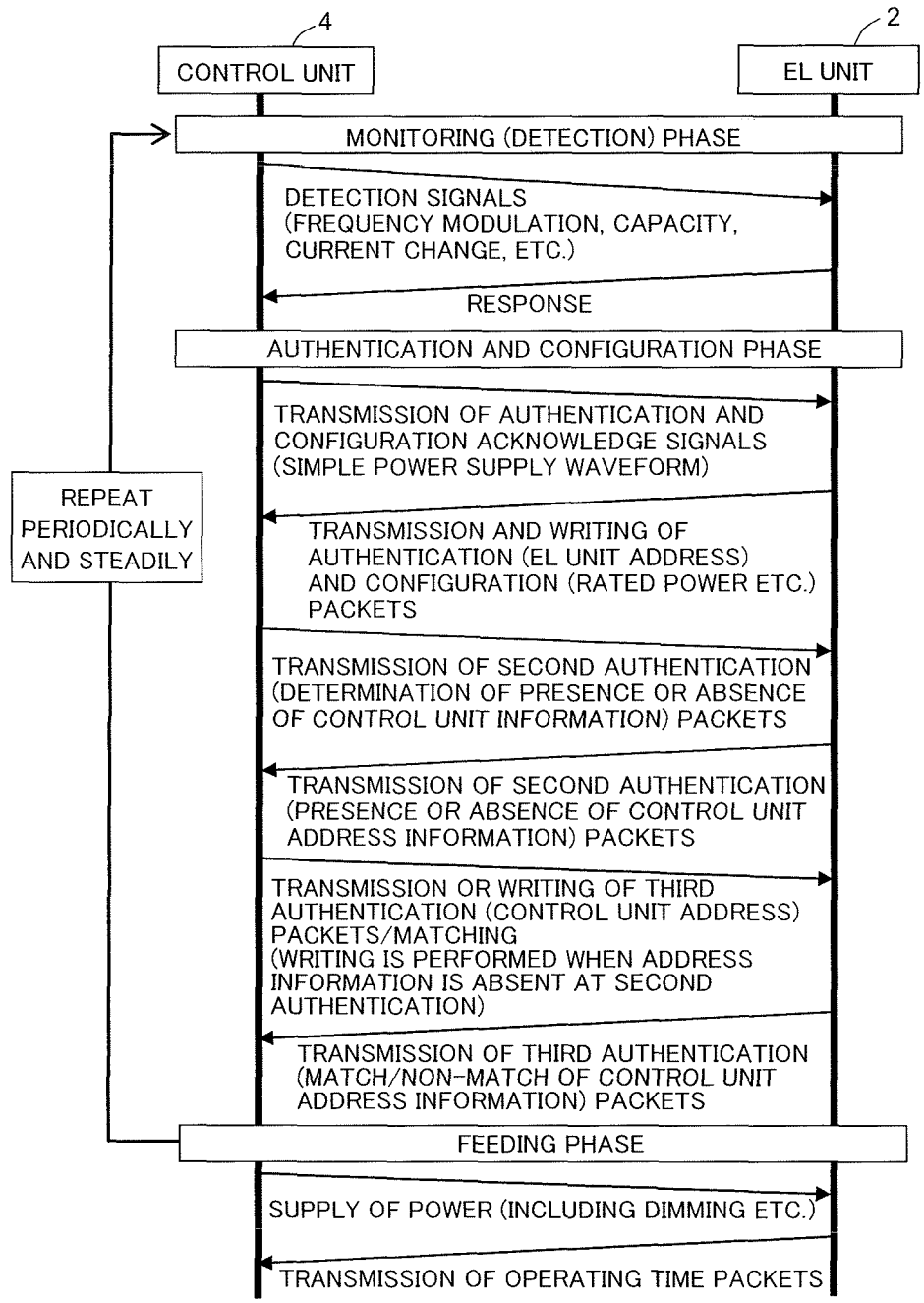
FIG. 39 shows an operation flow of a lighting system according to a seventh embodiment of the present invention.
Figure 40:
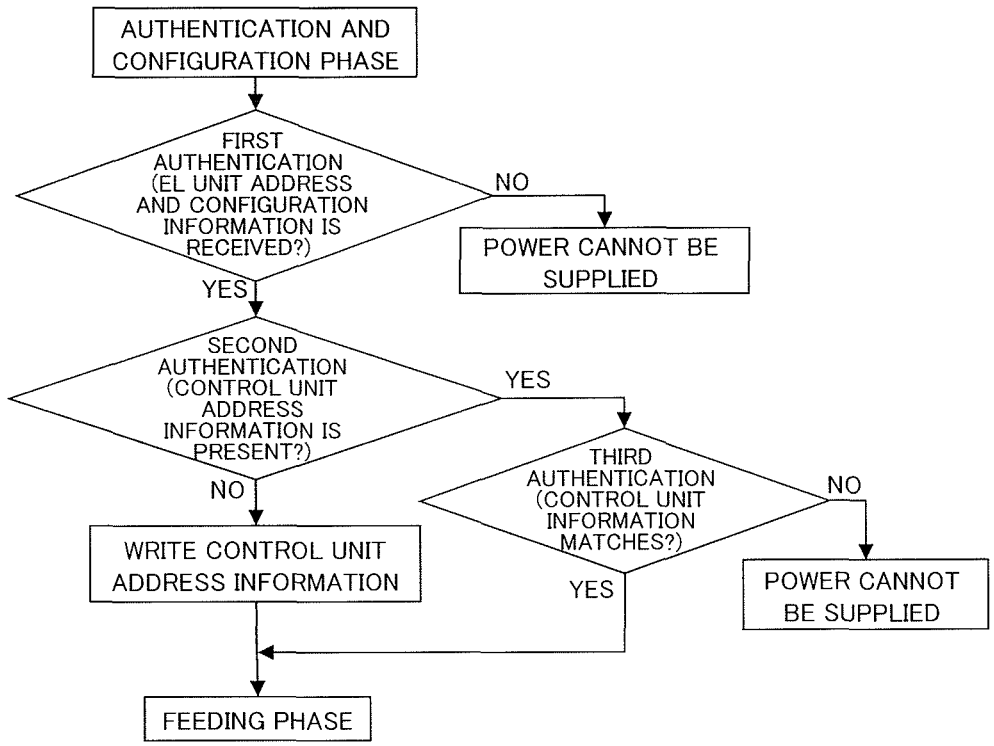
FIG. 40 is a flowchart showing a detailed operation flow of the lighting system.

Referring now to FIG. 39 and FIG. 40 in addition to FIG. 2 described above, a lighting system according to a seventh embodiment of the present invention is described. The lighting system 1 of this embodiment is configured so that a control unit 4 and an EL unit 2 authenticate each other and, when the EL unit 2 is authenticated, the control unit 4 supplies power to the EL unit 2. Here, the specific operation of the lighting system 1 is described. Like the first embodiment described above, the system of this embodiment also repeats (1) a monitoring (detection) phase, (2) an authentication and configuration phase, and (3) a feeding phase periodically and steadily between the control unit 4 and the EL unit 2, whereby communication is performed and power is supplied, as shown in FIG. 39. In the first embodiment described above, the control unit 4 determines whether or not the EL unit 2 is compatible with the lighting system 1. On the other hand, in the lighting system 1 of this embodiment, the control unit 4 and the EL unit 2 authenticate each other and mutually determine that they are specified in advance by an administrator, and then power is supplied. More particularly, in the lighting system 1 of this embodiment, the (2) authentication and configuration phase is different from that in the first embodiment described above. The (1) monitoring (detection) phase and the (2) authentication and configuration phase are similar to those in the first embodiment described above.

In the (2) authentication and configuration phase of this embodiment, acknowledge signals are firstly output from the control unit 4 to the EL unit 2. In response to the acknowledge signals, the EL unit 2 outputs, to the control unit 4, information such as the address assigned to the unit itself and the rated current of a light emitter 20 mounted in the EL unit 2. Such information (packets) is written to the memory (main controller 42) in the control unit 4. When the control unit 4 receives such information, it recognizes that the EL unit 2 is compatible with the lighting system 1 (first authentication). On the other hand, when the above described information is not transmitted or received, authentication of the EL unit 2 is not performed and, as shown in FIG. 40, the control unit 4 determines that power cannot be supplied to a conductive member 30. Subsequently, the control unit 4 transmits, to the EL unit 2, communication signals and determines whether or not the EL unit 2 has address information for the control unit 4. When the EL unit 2 has the address information for a control unit 4, it transmits the address information to the control unit 4 in response to the communication signals (second authentication). When the address information for a control unit 4 is transmitted from the EL unit 2, the control unit 4 determines whether or not the transmitted address information matches its own address information (third authentication). When the address information is matched, the control unit 4 proceeds to the (3) feeding phase. On the other hand, when the address information is not matched, it is determined that power cannot be supplied to the EL unit 2. Further, when the EL unit 2 does not have address information for a control unit 4, it writes address information for the control unit 4 to a memory in the EL unit itself.

The case where an EL unit 2 does not have address information for a control unit 4 is defined as that the EL unit 2 is new or initialized. Once an EL unit 2 is installed in any lighting system 1, the EL unit 2 has address information for a control unit 4. Therefore, for example, even if an EL unit 2 stolen from another lighting system 1 is used in his/her own lighting system 1, address information for the original control unit 4 is recorded in the EL unit 2. Accordingly, it does not match address information for the control unit 4 in his/her own lighting system 1 and thus power is not supplied to the EL unit 2.

As described above, according to this embodiment, power is supplied only when a control unit 4 and an EL unit 2 are mutually authenticated, power is not supplied. When the mutual authentication is not performed, power is not supplied to the EL unit 2. In other words, even if someone steals an EL unit 2 from another person's lighting system 1, he/she cannot use it in his/her own lighting system 1. This can at least prevent an EL unit 2 from being stolen by a user of a lighting system 1. However, although an EL unit 2 does not work by itself, it may be stolen by a person who has no knowledge of a lighting system 1. Therefore, in the case where a lighting system 1 is installed in any place where large groups of people congregate, e.g. in a commercial facility, it is preferable that physical anti-theft means such as the wire 6 described in the above sixth embodiment is provided.

Figure 41:
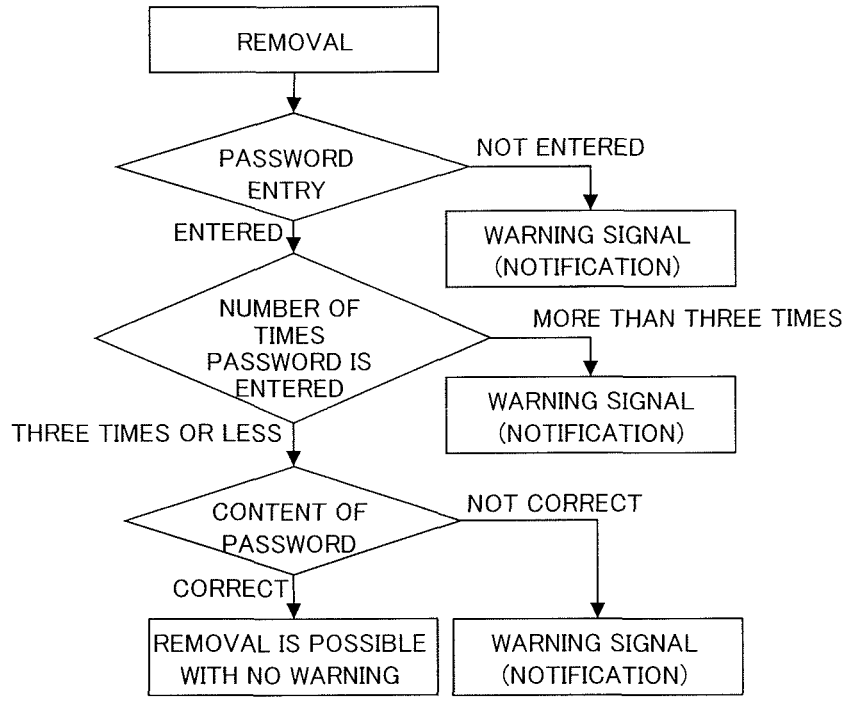
FIG. 41 is a flowchart showing a detailed operation flow in a modified example of the lighting system.

Referring to FIG. 41, a lighting system according to a modified example of this embodiment is described. In the lighting system 1 according to this modified example, a control unit 4 outputs a warning signal when an EL unit 2 is removed from a holding frame 3. For example, an alarm is used as the warning signal. Further, the control unit 4 is configured so that the warning signal is not output when administrative information is entered by an administrator. The administrative information may include, for example, a password entered through an interface provided in the control unit 4. The operation flow in this case is shown in FIG. 41. Only when the correct password is entered within three attempts, the control unit 4 does not output the warning signal at the time of removal of the EL unit 2. This can systematically prevent the EL unit 2 from being stolen.

The prevent invention is not limited to the above embodiments but various modifications may be made. In the embodiments described above, the holding frame 3 is connected to only one end of the front cap 51 in which the control unit 4 is mounted, but, for example, two holding frames 3 may be connected to the two ends of the front cap 51. In this case, the two ends of the front cap 51 may be provided with contacts 44, which are connected to the conductive members 30 of the holding frames 3, respectively, and EL units 2 connected to the two conductive members 30 may be controlled by a single control unit 4.

DESCRIPTION OF REFERENCE NUMERALS 1 lighting system
2 EL unit
20 light emitter
21 panel controller
27 projection
27a hooked portion
27b protrusion
28 fixed portion
28a claw
3 holding frame
30 conductive member
33 edge portion
33a linear recess
35a cover member 35b cover member
35c cover member
38 hook
39 receiving portion
39c linear receiving portion
4 control unit
41 power supply
5 protection unit
58 case unit
6 wire

The invention claimed is:

1. A lighting system comprising:
an electroluminescence (EL) unit having a light emitter which is a planar organic EL device;
a holding frame that holds the EL unit, the holding frame comprising a rail-shaped conductor;
at least one protector connected at each end of the holding frame that protects the conductor, the at least one protector being attachable to and removable from each end of the rail shaped conductor of the holding frame; and
a control unit mounted in one of the at least one protector that controls lighting of the EL unit and that comprises a power supply that transmits power to the rail-shaped conductor, wherein
power and communication signals are transmitted between the control unit and the EL unit through the conductor.

2. The lighting system according to claim 1, wherein the EL unit comprises a controller configured to control a light-emitting state of the light emitter in response to the communication signals from the control unit.

3. The lighting system according to claim 1, further comprising a case that is held by the holding frame, wherein the control unit is mounted in the case.

4. The lighting system according to claim 1, wherein the holding frame comprises a cover that is disposed over the conductor and is movable, and
the conductor is exposed with respect to the EL unit by moving the cover.

5. The lighting system according to claim 1, wherein the holding frame has an elongated shape and comprises a pair of linear recesses extending to both the ends of the holding frame in its longitudinal direction, and
the EL unit comprises a pair of projections, which are to be engaged with the pair of linear recesses, on a surface thereof facing the holding frame and is held on the holding frame by engagement of the pair of projections with the pair of linear recesses.

6. The lighting system according to claim 1, wherein the holding frame has an elongated shape and comprises a hook formed on one of edge portions extending along a longitudinal direction thereof and a recess formed in the other of edge portions,
the hook is slidable while being biased in a direction perpendicular to the longitudinal direction, and
the EL unit comprises, on a surface thereof facing the holding frame, a hooked portion that is to be engaged with the hook and a projection that is to be engaged with the recess, and the EL unit is held on the holding frame by engagement of the projection with the recess and by engagement of the hooked portion with the hook.

7. The lighting system according to claim 1, wherein the holding frame has an elongated shape and comprises a pair of recesses formed in both edge portions along a longitudinal direction thereof, and wherein the EL unit comprises a pair of projections, which are to be engaged with the recesses, on a surface thereof facing the holding frame,
one of the pair of projections is slidable while being biased in a direction perpendicular to the longitudinal direction of the holding frame, and
the EL unit is held on the holding frame by engagement of the one of the pair of projections with one of the recesses and by engagement of the other of the pair of projections with an other of the recesses.

8. The lighting system according to claim 1, wherein
the EL unit comprises a fixed portion protruding toward the holding frame on a surface thereof facing the holding frame,
the fixed portion has a pair of claws that is slidable while being biased in directions perpendicular to the protruding direction,
the holding frame has a receiving portion, which is engaged with the pair of claws, at a position corresponding to the fixed portion, and
the EL unit is held on the holding frame by engagement of the pair of claws with the receiving portion.

9. The lighting system according to claim 1, wherein
the EL unit comprises a fixed portion protruding toward the holding frame on a surface thereof facing the holding frame,
the fixed portion has a pair of claws that is slidable while being biased in directions perpendicular to the protruding direction,
the holding frame has an elongated shape and has a linear receiving portion that extends to both the ends of the holding frame in its longitudinal direction and is configured to be engaged with the claws, and
the EL unit is held on the holding frame by engagement of the pair of claws with the linear receiving portion.

10. The lighting system according to claim 1, wherein the EL unit and the holding frame are connected by a wire.

11. The lighting system according to claim 1, wherein the control unit and the EL unit authenticate each other, and
when the EL unit is authenticated, the control unit supplies power to the EL unit.

12. The lighting system according to claim 1, wherein the control unit outputs a warning signal when the EL unit is removed from the holding frame.

13. The lighting system according to claim 12, wherein the control unit fails to output the warning signal when administrative information is entered by an administrator.

14. The lighting system according to claim 1, wherein a pair of protectors is disposed at each end of the holding frame.

15. The lighting system according to claim 1, wherein the at least one protector comprises a holder, distinct from the holding frame, in which the control unit is mounted and a contact member extending from within the holder to outside of the holder, the contact member contacting the rail-shaped conductor.

16. The lighting system according to claim 1, wherein the at least one protector has a size, in at least one dimension, that is substantially equal to a size of the electroluminescence unit in the same dimension.

17. The lighting system according to claim 1, wherein the at least one protector is configured and positioned so as to cover an end of the rail-shaped conductive member.

18. The lighting system according to claim 1, wherein the rail shaped conductor extends to both longitudinal ends of the holding frame.

19. The lighting system according to claim 18 wherein, the at least one protector comprises an end cap that is attachable to one longitudinally extending end of the holding frame.

20. The lighting system according to claim 1, wherein the at least one protector comprises an end cap having an end face that faces an end face of the holding frame and has a shape corresponding to a shape of the end face of the holding frame.

* * * * *